US008213310B2

(12) United States Patent
Santhanam et al.

(10) Patent No.: US 8,213,310 B2
(45) Date of Patent: Jul. 3, 2012

(54) HIGH-PRIORITY COMMUNICATIONS SESSION WITHIN A WIRELESS COMMUNICATIONS SYSTEM

(75) Inventors: Arvind V. Santhanam, San Diego, CA (US); Bongyong Song, San Diego, CA (US); Harleen K. Gill, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 561 days.

(21) Appl. No.: 12/392,635

(22) Filed: Feb. 25, 2009

(65) Prior Publication Data

US 2010/0214996 A1    Aug. 26, 2010

(51) Int. Cl.
*G01R 31/08* (2006.01)
*H04Q 7/28* (2006.01)

(52) U.S. Cl. ........................................ 370/231; 370/329
(58) Field of Classification Search .................. None
See application file for complete search history.

(56) References Cited

U.S. PATENT DOCUMENTS

| | | | |
|---|---|---|---|
| 6,192,248 B1 | 2/2001 | Solondz | |
| 7,606,593 B1 | 10/2009 | Vu | |
| 7,738,644 B2* | 6/2010 | Brannick et al. | 379/212.01 |
| 7,881,261 B2* | 2/2011 | Julka et al. | 370/331 |
| 2006/0270422 A1 | 11/2006 | Benco et al. | |
| 2007/0117564 A1* | 5/2007 | Reynolds | 455/436 |
| 2007/0149203 A1 | 6/2007 | Sliva | |
| 2007/0198704 A1* | 8/2007 | Huh | 709/224 |
| 2008/0165731 A1* | 7/2008 | Zellner | 370/329 |
| 2008/0311916 A1* | 12/2008 | Gallagher et al. | 455/436 |
| 2009/0119382 A1* | 5/2009 | Bakker et al. | 709/206 |
| 2009/0143046 A1 | 6/2009 | Smith | |
| 2009/0190761 A1* | 7/2009 | Tamura et al. | 380/270 |
| 2009/0198704 A1 | 8/2009 | Landberg | |

OTHER PUBLICATIONS

1xEV-DO Revision A Over-the-Air QoS Configuration Example, Aug. 30, 2007.*
"1xEV-Do Revision A Over-the-Air QoS Configuration Example, Aug. 30, 2007".
International Search Report and Written Opinion—PCT/US2010/025424, International Search Authority—European Patent Office—Aug. 17, 2010.

* cited by examiner

*Primary Examiner* — Hassan Phillips
*Assistant Examiner* — Eunsook Choi
(74) *Attorney, Agent, or Firm* — Raphael Freiwirth

(57) ABSTRACT

An access network receives a request from an access terminal for communication session support resources associated with a communication session, determines whether sufficient communication session support resources are available for allocating to the access terminal and selects communication session support resources from another access terminal for de-allocation, the selected at least one communication session support resource associated with a communication session having a lower priority than the communication session. The access network sends instructions to the at least one other access terminal to facilitate de-allocation of the selected communication session support resource, and allocates communication session support resources to the access terminal for supporting the communication session after the selected communication session support resource is de-allocated from the other access terminal.

75 Claims, 17 Drawing Sheets

HIGH-PRIORITY COMMUNICATIONS SESSION WITHIN A WIRELESS COMMUNICATIONS SYSTEM

BACKGROUND OF THE INVENTION

1. Field of the Invention

Embodiments of the invention relates to setting up a high-priority communications session within a wireless communications system.

2. Background

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

The group communication or PTT call is generally initiated from an originating access terminal that sends the initial request for the group communication. Conventional systems require multiple communications from the originator to establish communication links to the wireless network/group communication infrastructure to enable the establishment of the group call. These multiple communications can lead to additional delay in establishing the group call and therefore a degradation in the overall user experience.

SUMMARY OF THE INVENTION

Embodiments are directed to setting up a high-priority communications session in a wireless communications network operating in accordance with a wireless communications protocol. An access network receives a request from an access terminal (e.g., a target access terminal, a session originator, etc.) for communication session support resources associated with a communication session. The access network determines whether sufficient communication session support resources are available for allocating to the access terminal for supporting the communication session. The access network selects at least one communication session support resource from at least one other access terminal for de-allocation, the selected at least one communication session support resource associated with a communication session having a lower priority than the communication session. The access network sends instructions to the at least one other access terminal to facilitate de-allocation of the selected at least one communication session support resource, and allocates one or more communication session support resources to the access terminal for supporting the communication session after the selected at least one communication session support resource is de-allocated from the at least one other access terminal.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1A:
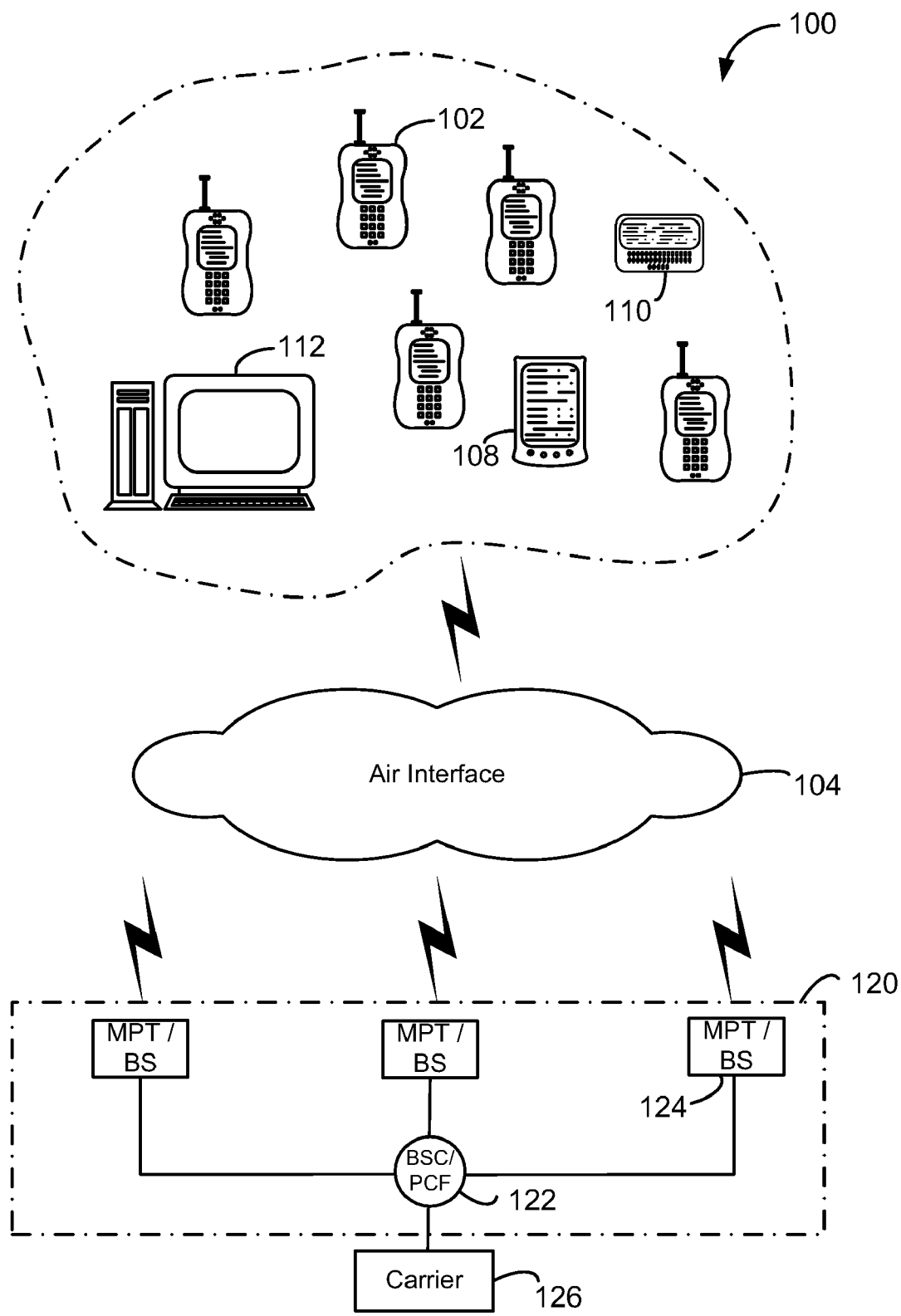
FIG. 1A is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station (e.g. a 1xEV-DO enabled wireless device), referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or mobile switching center (MSC). Modem pool transceivers and modem pool controllers are parts of a network called an access network. An access network (AN) (also referred to herein as a radio access network (RAN)) transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1A illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1A, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 160 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 1B:
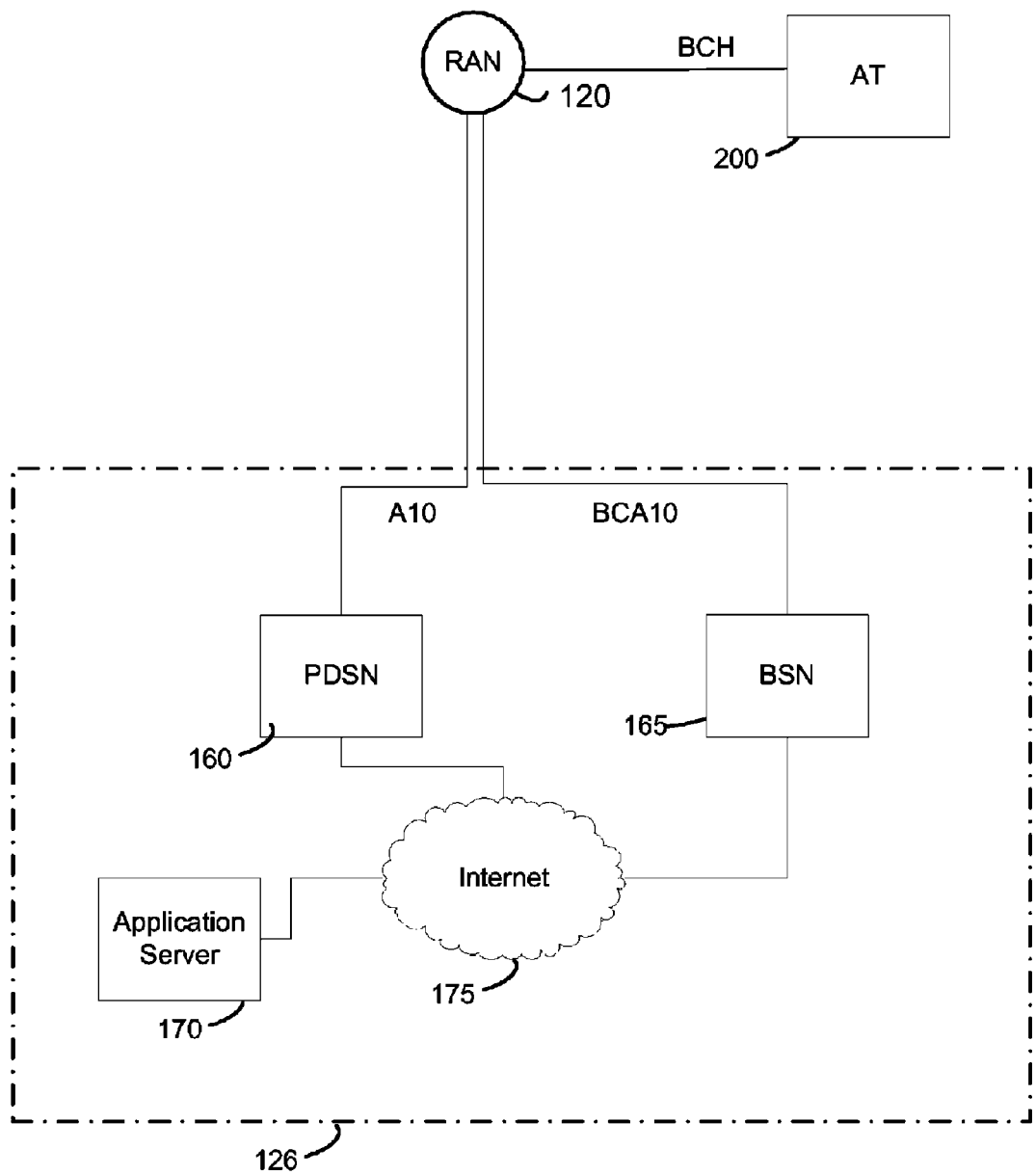
FIG. 1B illustrates the carrier network according to an example embodiment of the present invention.
Figure 2:
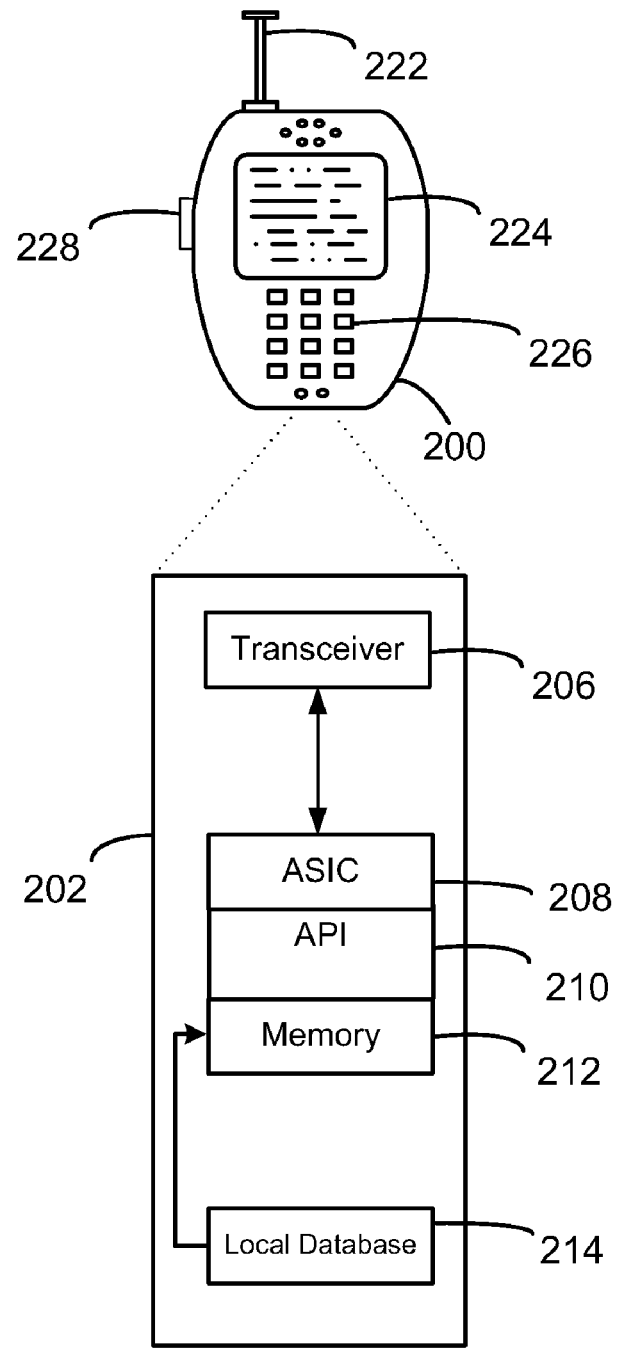
FIG. 2 is an illustration of an access terminal in accordance with at least one embodiment of the invention.

FIG. 1B illustrates the carrier network 126 according to an embodiment of the present invention. In the embodiment of FIG. 2, the carrier network 126 includes a packet data serving node (PDSN) 160, a broadcast serving node (BSN) 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1A) utilizing, for example, a cdma2000 Radio Access Network (RAN) (e.g., RAN 120 of FIG. 1A). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 1B, the PDSN 160 may communicate with the RAN 120 (e.g., the BSC/PCF 122) via a conventional A10 connection. The A10 connection is well-known in the art and will not be described further for the sake of brevity.

Referring to FIG. 1B, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Generally, as will be described in greater detail below, the RAN 120 transmits communication messages, received from the BSN 165 via the BCA10 connection, over a broadcast channel (BCH) of the air interface 104 to one or more access terminals 200.

Referring to FIG. 2, the access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. For example, the access terminal can include logic configured to bundle a connection request and a reservation for QoS resources into an access message and logic configured to transmit the access message to an access network. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 2 are to be considered merely illustrative and the invention is not limited to the illustrated features or arrangement.

The wireless communication between the access terminal 102 and the RAN 120 can be based on different technologies, such as code division multiple access (CDMA), time division multiple access (TDMA), frequency division multiple access (FDMA), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the access network using a variety of networks and configurations. Accordingly, the illustrations provided herein are not intended to limit the embodiments of the invention and are merely to aid in the description of aspects of embodiments of the invention.

Figure 3A:
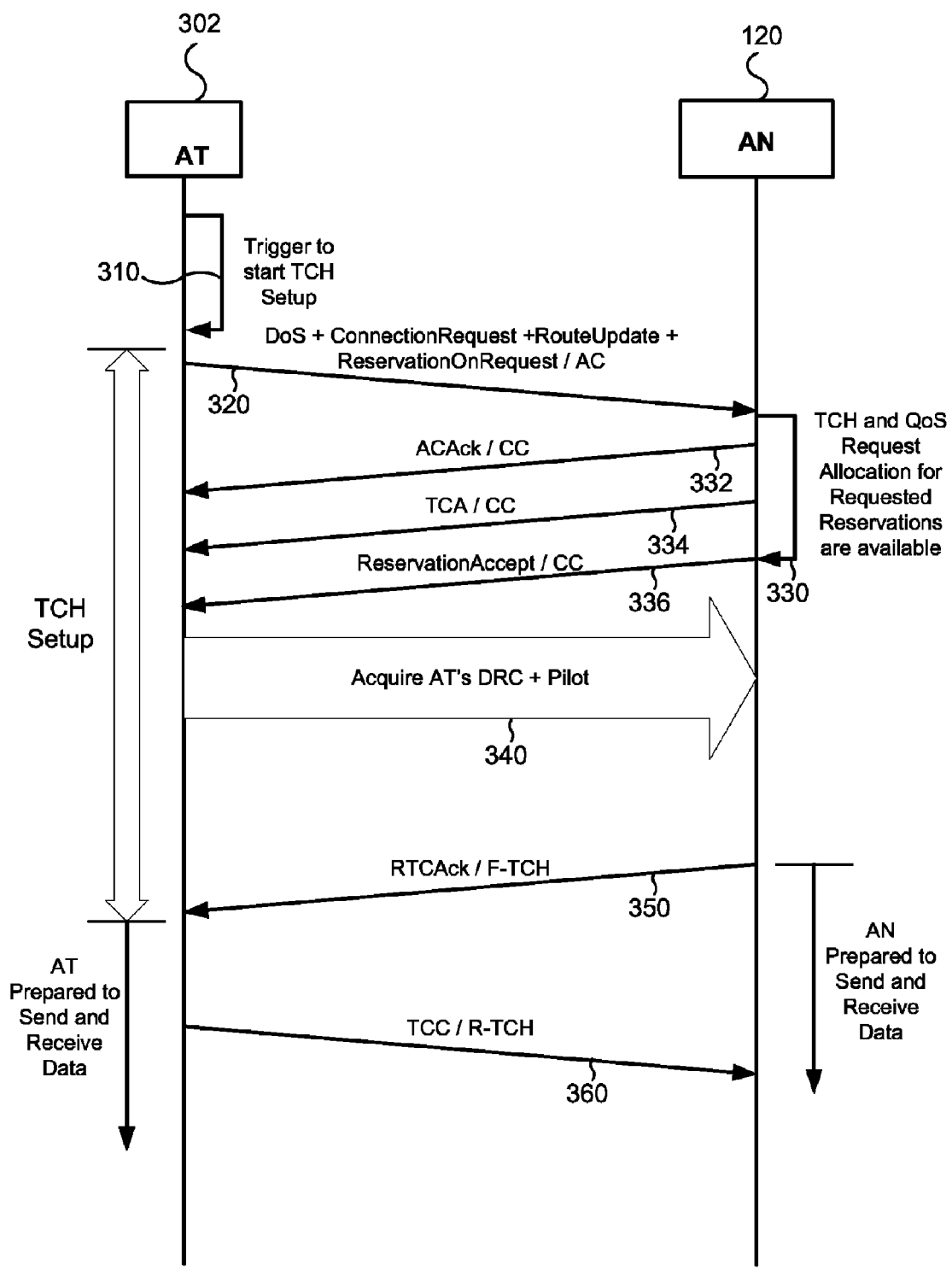
FIGS. 3A-3C are signal flow diagrams in accordance with embodiments of the invention.

FIG. 3A illustrates a flow diagram for bundling communications in accordance with embodiments of the invention. In 310, there is an initial trigger at an access terminal (AT) 302 to establish the communication request (e.g., a PTT button 228 is pressed) and the information needed to establish the communication with the access network (AN) 120 is bundled into an access channel message (e.g., a connection request (ConnectionRequest and route update information (Route-Update)), provisioning for any QoS services used for the communication (ReservationOnRequest), etc.). Additionally, application layer data (e.g. a DataOverSignaling (DOS) message) may also be bundled in the access channel message to expedite communication with an end application (e.g., the group server, application resident on another AT, etc.) Once the access message is bundled with the desired information (e.g., DOS+ConnectionRequest+RouteUpdate+ReservationOnRequest), the access message can be sent 320 over the access channel (AC) to the access network (AN) 120.

Once the bundled message 320 is received at the access network 120, the access network can process the request 330. In 330, the access network can allocate a traffic channel (TCH) and the requested QoS resources for the requested reservations, assuming the traffic channel and QoS resources are available. Specifically, the access network 120 can acknowledge the access message (ACAck), 332, transmit a traffic channel assignment (TCA), 334, and transmit a reservation accept message (ReservationAccept), 336. These messages can be transmitted on a control channel (CC) to AT 302. A data rate control (DRC) message can be sent, 340, from the AT 302 to establish a data communication rate with the AN 120. After successfully receiving and decoding the DRC and pilot, the AN 120 can transmit a Reverse Traffic Channel Acknowledge (RTCAck) message, 350, on the forward traffic channel (F-TCH). Upon receipt of the RTCAck message, the AT 302 can send a Traffic Channel Complete (TCC) message, 360, on the reverse traffic channel (R-TCH). Dedicated channels are then established in both the forward and reverse directions and the AT 302 and the AN 120 can both communicate data bidirectionally. The various messages communicated between access terminal 302 and access network 120 are known in the art and are documented in 3GPP2 C.S0024-A Version 3.0, cdma2000 High Rate Packet Data Air Interface, dated Sep. 12, 2006, which is incorporated herein by reference in its entirety. Accordingly, a detailed explanation of the setup procedures and messages will not be provided herein.

If the DOS message or other application layer message is optionally bundled in the connection request access message, that information does not impact the traffic channel setup, discussed in the foregoing. Generally, the application specific data can be detected and merely passed on to the appropriate destination by AN 120. However, the application specific information may further reduce latency in delay sensitive applications by providing data needed (e.g., a PTT call request) for further processing by remote applications (e.g., a PTT server) to establish the data communication (e.g., a PTT call) once the traffic channels are setup between AT 302 and AN 120. Accordingly, the data included in the application layer message does not have to wait for the establishment of the traffic channels between the AT 302 and AN 120 before being forwarded to the network.

As will be appreciated by those skilled in the art the QoS resources needed may vary for different applications or within applications. The following examples describe QoS design under different QoS resource scenarios:

When traffic channel resources and QoS resources (e.g., In-Call Signaling and Media reservations) are available in the sector of the originator AT 302 sector, the RAN signals that QoS resources are available for both the forward and reverse links by transmitting FwdReservationOn and RevReservationOn messages for the In-Call Signaling and Media reservations. This case is illustrated in FIG. 3A and described in the foregoing description.

Figure 3B:
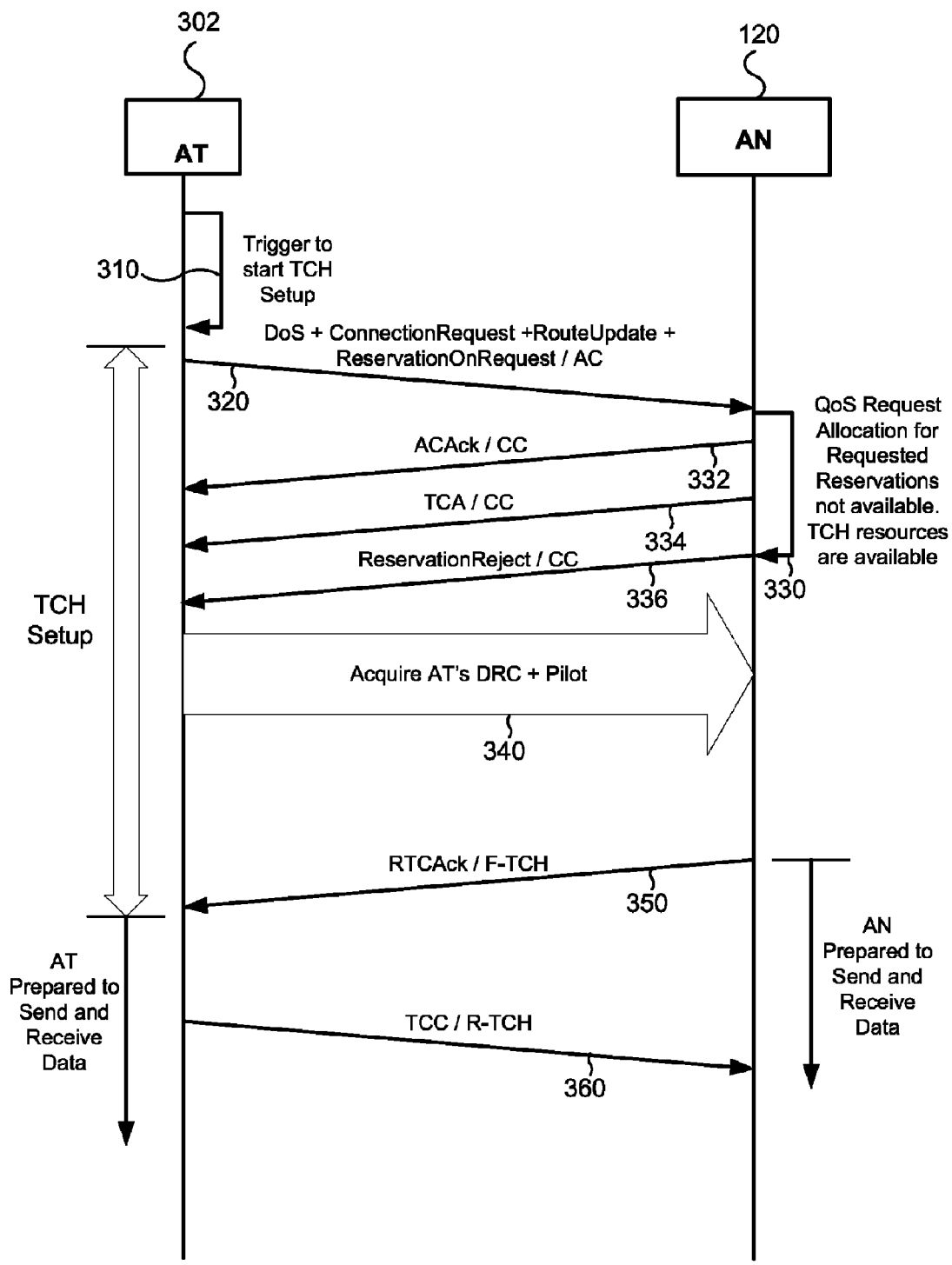

When traffic channel resources are available in the sector where the originator AT 302 is located, but QoS resources for some or all of the reservations are not available, the AN 120 can still allocate the traffic channel and transmits the TCA message to the originator AT 302. However, the AN 120 rejects the QoS request for the reservations it cannot provision by transmitting a ReservationReject message to AT 302. The availability of the traffic channel enables the AT 302 to attempt to complete its call setup signaling handshake over the traffic channel when the QoS resources (e.g., In-Call Signaling and Media reservations) are not available. This case is illustrated in FIG. 3B.

Figure 3C:
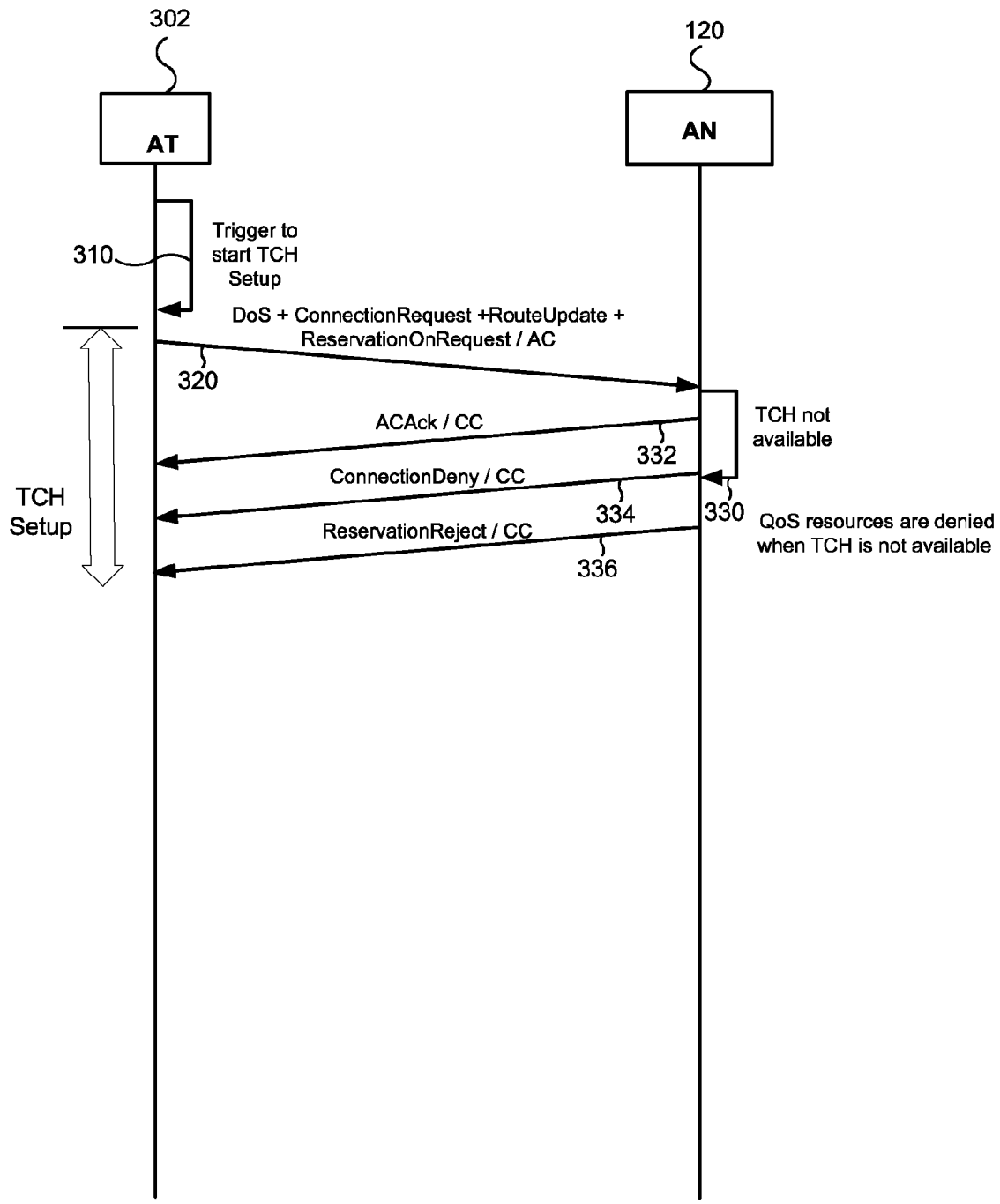

When no traffic channel resources are available in the originator AT's sector, the AN denies the traffic channel request by transmitting the ConnectionDeny message (e.g., per the 1xEV-DO Revision A standard). In this case the QoS request for the reservations also is denied by transmitting a ReservationReject message to AT 302. This case is illustrated in FIG. 3C.

If some of the In-Call Signaling and Media reservations are already allocated to the originator AT at the time of arrival of a call setup packet, the AN/RAN may only activate the In-Call Signaling and Media reservations that are not currently allocated.

As noted above, embodiments of the invention can reduce process delays in delay sensitive applications. A group communication/Push-to-Talk (PTT) system is an example of a delay sensitive system that can take advantage of reduced connection times offered by the communication signal bundling disclosed herein. For example, embodiments of the invention provide for an AT to send a request to turn on the reservations for needed QoS resources (e.g., In-Call Signaling and Media reservations for a PTT call) by transmitting a ReservationOnRequest message in the same access capsule as its connection request (e.g., ConnectionRequest+RouteUpdate) message. Optionally, a DataoverSignaling (DOS) message can be bundled in the same access capsule. If the In-Call Signaling forward and reverse QoS reservations are allocated at the time of the PTT call, the AT can request the Media QoS reservations to be turned on. These requests can be made as part of the ReservationOnRequest message.

The group communication system may also be known as a push-to-talk (PTT) system, a net broadcast service (NBS), a dispatch system, or a point-to-multi-point communication system. Typically, a group of access terminal users can communicate with one another using an access terminal assigned to each group member. The term "group member" denotes a group of access terminal users authorized to communicate with each other. Although, group communication systems/PTT systems may be considered to be among several members, the system is not limited to this configuration and can apply to communication between individual devices on a one to one basis.

The group may operate over an existing communication system, without requiring substantial changes to the existing infrastructure. Thus, a controller and users may operate in any system capable of transmitting and receiving packet information using Internet protocol (IP), such as a Code Division Multiple Access (CDMA) system, a Time Division Multiple Access (TDMA) system, a Global System for Mobile Communications (GSM) system, satellite communication systems, combinations of land line and wireless systems, and the like.

Group members may communicate with each other using an assigned access terminal, such as access terminals (ATs) 102, 108, and 302. The ATs may be wireline or wireless devices such as terrestrial wireless telephones, wireline telephones having push-to-talk capability, satellite telephones equipped with push-to-talk functionality, laptop or desktop computers, paging devices, or any combination thereof. Furthermore, each AT may be able to send and receive information in either a secure mode, or a non-secure (clear) mode. It should be understood that reference to an AT is not intended to be limited to the illustrated or enumerated examples, and may encompass other devices that have the capability to transmit and receive packet information in accordance with the Internet Protocol (IP).

When a group member wishes to transmit information to other members of the group, the member may request the transmission privilege by pressing a push-to-talk button or key (e.g., 228 in FIG. 2) on an AT, which generates a request formatted for transmission over a distributed network. For example, the request may be transmitted over the air to one from AT 102 or more MPTs (or base stations) 124. A BSC/PCF 122, which may include a well-known inter-working function (IWF), packet data serving node (PDSN), or packet control function (PCF), for processing data packets may exist between MPT/BS 124 and the distributed network. However, the requests may also be transmitted through the public switched telephone network (PSTN) to a carrier network 126. The carrier network 126 may receive the request and provide it to the RAN 120.

Figure 4:
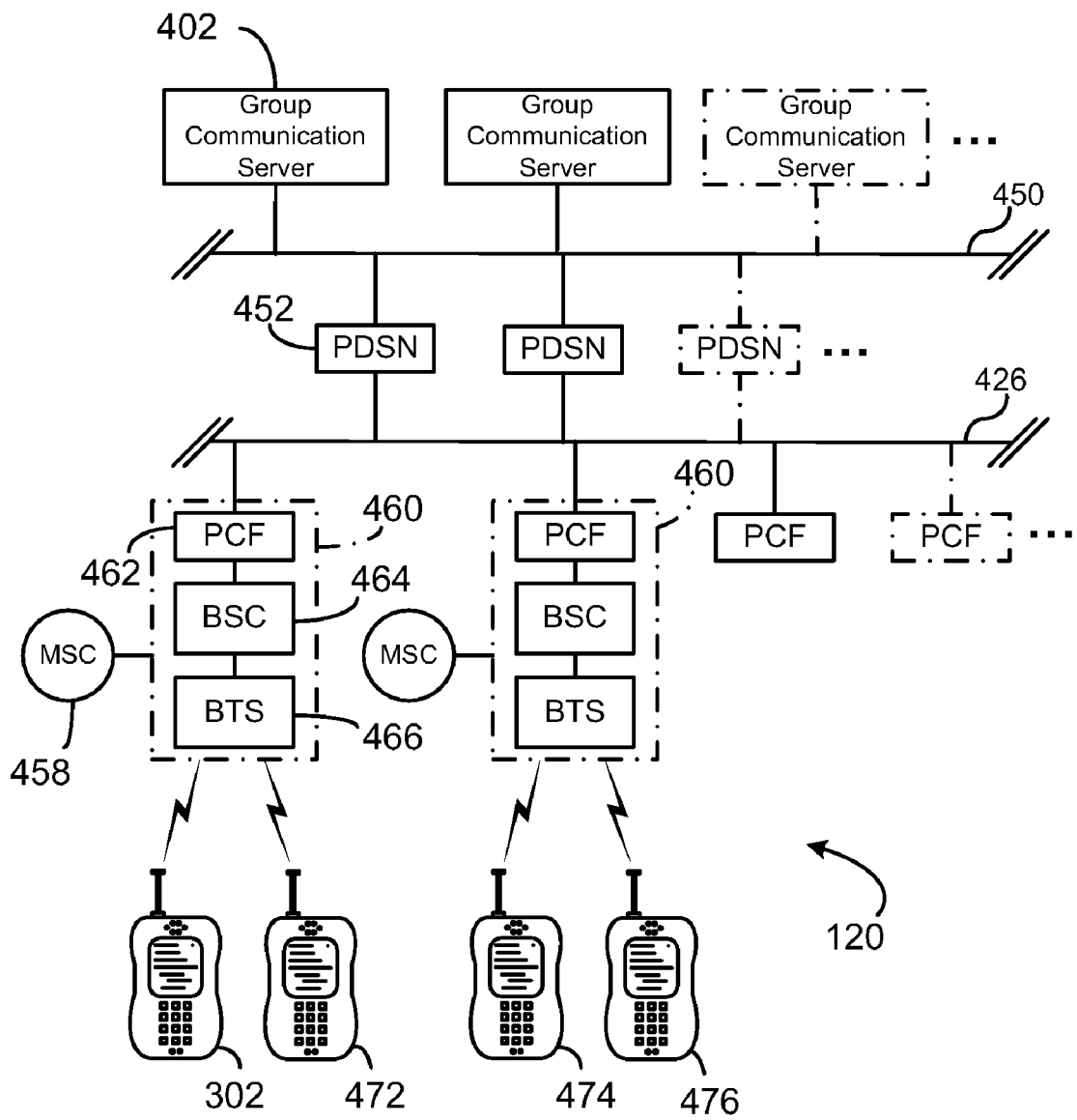
FIG. 4 is an illustration of a group communication system in accordance with at least one embodiment of the invention.

Referring to FIG. 4, one or more group communication servers 402 can monitor traffic of the group communication system through its connection to a distributed network. Since the group communication server 402 can be connected to the distributed network through a variety of wired and wireless interfaces, geographic proximity to group participants is not necessary. Typically, a group communication server 402 controls communications between the wireless devices of set group members (ATs 302, 472, 474, 476) in a PTT system. The wireless network illustrated is merely exemplary and can include any system whereby remote modules communicate over-the-air between and among each other and/or between and among components of a wireless network including, without limitation, wireless network carriers and/or servers. Further, a series of group communication servers 402 can be connected to a group communication server LAN 450.

The group communication server(s) 402 can be connected to a wireless service provider's packet data service node (PDSN) such as PDSN 452, shown here resident on a carrier network 426. Each PDSN 452 can interface with a base station controller 464 of a base station 460 through a packet control function (PCF) 462. The PCF 462 may be located in the base station 460. The carrier network 426 controls messages (generally in the form of data packets) sent to a MSC 458. The MSC 458 can be connected to one or more base stations 460. In a similar manner to the carrier network, the MSC 458 is typically connected to the BTS 466 by both the network and/or Internet for data transfer and PSTN for voice information. The BTS 466 ultimately broadcasts and receives messages wirelessly to and from the wireless ATs, such as cellular telephones 302, 472, 474, 476, as is well known in the art. Accordingly, the general details of a group communication system will not be further discussed. Further, although the description herein discusses specific aspects of specific systems (e.g., PTT, QChat®, 1xEV-DO) to provide additional details and examples, embodiments of the invention are not limited to these specific illustrations.

As discussed above, the AT 302 requests a traffic channel in order to establish a communication (e.g., a PTT call). The PTT call can be originated by the originator AT 302 if both, traffic channel and QoS resources for In-Call Signaling and Media are available (additional details regarding the QoS resources are provided below and in FIG. 5). In the conventional systems, the AT 302 would have to establish the traffic channel connection with the AN 120 and then request the QoS resources. However, to reduce this delay in accordance with embodiments of the invention, the signaling messages need to establish the PTT call are bundled in the initial access channel message along with the original connection request.

1xEV-DO Revision A is designed to provide efficient access to packet data networks and is widely based on the Internet for its network architecture. Data traffic traversing Internet Protocol (IP) network elements at the PDSN 452, PCF 462, and RAN 120 can be based on standard Internet Engineering Task Force (IETF)-based protocols that support methods for differentiating traffic based on QoS requirements. QoS between the AT 302 and the 1xEV-DO Revision A network is configured as described in the 3GPP2 X.S0011-004-C Version 2.0 cdma2000 Wireless IP Network Standard: Quality of Service and Header Reduction specification, the contents of which are incorporated herein by reference. Data traffic transmitted over the air interface between the AT 302 and the RAN 120 can be configured for appropriate QoS treatment via 1xEV-DO Revision A protocols as described in the 3GPP2 C.S0024-A Version 3.0 document referenced above. 1xEV-DO Revision A provides standard mechanisms to offer intra-AT and inter-AT QoS. Intra-AT QoS provides differentiation of data streams belonging to the same user, while inter-AT QoS provides differentiation of packets belonging to different users.

To achieve QoS, traffic differentiation should be available end-to-end. All network components including the AT 302, RAN 120 (BTS 466, BSC 464), PDSN 452, and Internet routers should implement/support QoS. End-to-end QoS in 1xEV-DO Revision A networks can be achieved through the following mechanisms:

Packet Filters: Packet filters at the PDSN map forward traffic flows to the AT and define the QoS treatment that should be applied to forward data traffic. The AT signals QoS requests that establish packet filters at that PDSN as described in the 3GPP2 X.S0011-004-C Version 2.0 cdma2000 Wireless IP Network Standard: Quality of Service and Header Reduction specification.

QoS Profiles (Profile IDs): QoS Profiles and/or Profile IDs are a mechanism to specify (or predefine) relevant air interface parameters and network QoS requirements for a data service. It is a 'shorthand' identifier that the AT uses when requesting a QoS reservation for a flow with the RAN. Standard Profile ID assignments available for various data services are described in TSB58-G Administration of Parameter Value Assignments for cdma2000 Spread Spectrum Standards, the contents of which are incorporated herein by reference.

Reverse Traffic Marking: The AT can mark reverse traffic data in accordance with the Differentiated Services (DiffServ) framework and standards. These markings define the QoS network treatment requested for data outbound at the PDSN.

QoS in a 1xEV-DO Revision A network is also based on the proper mapping or binding of the following elements for the AT's PPP session, such as follows:

IP (Application) Flow: Application layer QoS requirements at the AT and PDSN are defined by identifying unique IP flows. A reservation label is associated with the IP flow to identify the QoS requirements for the flow between the AT and the RAN. An IP flow is then mapped onto an RLP flow that best satisfies the QoS requirements.

RLP (Link) Flow: Radio Link Protocol (RLP) flows are allocated based on QoS requirements (e.g., RLP parameter configuration) for upper layer flows. IP flows with the same QoS requirements can be mapped onto the same RLP flow. In the reverse direction, an RLP flow is mapped onto a (Reverse Traffic Channel Media Access Control) RTCMAC flow.

RTCMAC flow: RTCMAC flows are allocated based on QoS requirements that define physical layer latency and/or capacity needs for an upper layer flow. For example, flows can be low-latency or high capacity flows. RLP flows with the same QoS requirements can be mapped to the same RTCMAC flow.

Figure 5:
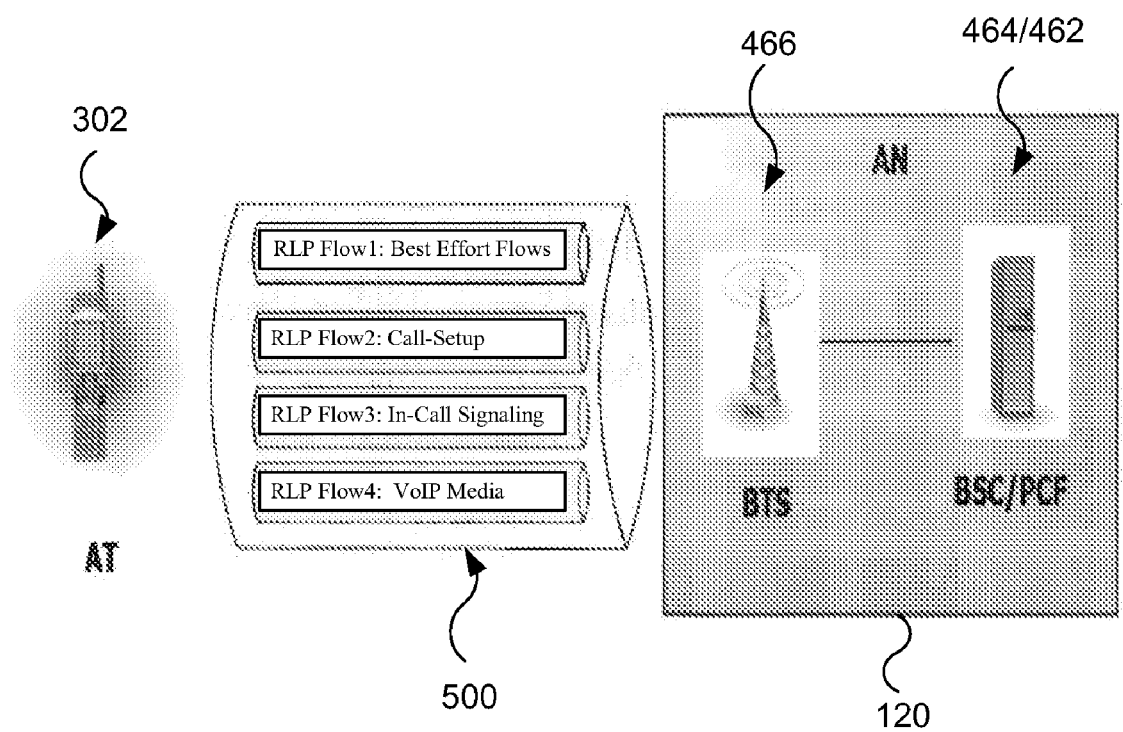
FIG. 5 is an illustration of Radio Link Protocol (RLP) flows in accordance with at least one embodiment of the invention.

FIG. 5 illustrates the multiple RLP flows 500 for a PTT-enabled AT 302 in communication with access network 120. The QoS requirements for each flow can be specified via QoS profiles. As noted above different applications can have different QoS requirements. For example, PTT over 1xEV-DO Revision A receives high priority and low latency data delivery through the specification of network QoS requirements. An exemplary PTT system can use the allocation of three IP flows at the AT, a flow for Call-Setup Signaling; a flow for In-Call Signaling; and a flow for Media. Each IP flow has specific QoS requirements and is mapped onto three separate RLP flows. The AT can further use a default Best Effort (BE) flow. QoS requirements for Media can be considered to be similar to VoIP media and therefore this RLP flow can be shared with VoIP.

Although the foregoing description provides many details specific to a PTT/QChat® system and the 1x EV-DO network to provide a detailed illustration of various aspects of embodiments of the invention, those skilled in the art will appreciate that embodiments of the invention are not limited to any specific application and/or network. Embodiments of the invention can include any application that has QoS requirements. Further, any network that can support the allocation of QoS resources bundled with the initial connection setup request can also be included in embodiments of the invention.

Figure 6:
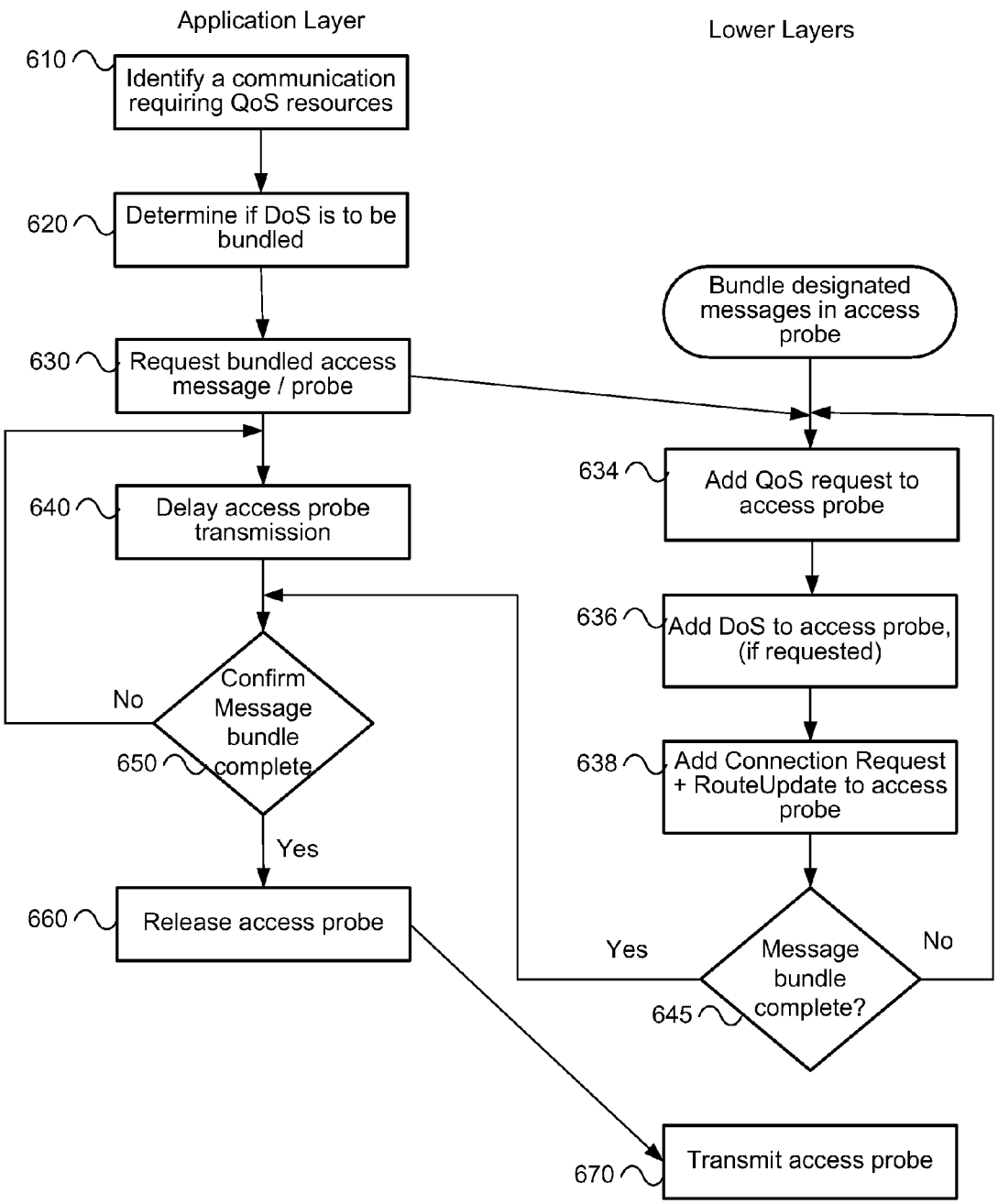
FIG. 6 is a flowchart in accordance with at least one embodiment of the invention.

Referring to FIG. 6, a flowchart illustrating the bundling process according to embodiments of the invention is provided. For example, the method can include an application identifying a communication to be requested that requires QoS resources (e.g., a PTT call), in block 610. Additional messages can be considered for bundling (e.g., DOS message) 620, if the additional message is used and there is room in the access probe. A request for a bundled access message (e.g., access probe) can then be communicated from the application layer, in block 630, to lower layers for bundling of the requested messages in the access probe. As used herein the application layer can include the requesting application (e.g., a PTT client) and a bundling API that facilitates interface between the application layer and the lower layers (e.g., RLC, MAC, and Physical Layers). However, it will be appreciated that embodiments of the invention are not limited to this configuration. For example, the application itself could contain the functionality of the bundling API.

In block 634, after the receipt of the bundled request, the QoS request can be added to the access probe. Likewise, in block 636, the DOS message can be added to the access probe if requested and there is sufficient space in the access probe. Additionally, in block 638, the connection request and route update messages are added to the access probe. A check can be performed to determine whether the bundled message is complete, in block 645. If not, the process can loop back to check for the missing messages, as they may be delayed. A delay element (e.g., timer) can also be set at the application layer, in block 640, to allow for the bundling of the access probe. The process can loop via block 650 until the application layer receives an indication from the lower layers that the message bundling is complete 645 (or until the event is timed out and the access probe is sent). After receiving the confirmation, the access probe delay can be released, 660, and the access probe can be transmitted 670.

As discussed in the foregoing, the trigger (e.g., 310) can be any event that causes an application to initiate a connection request with QoS requirements, which are known to the application. The trigger may be activated manually via hard key or soft key activation, may be activated in response to a received signal (e.g., voice command, signal from the network, etc.) or may be activated in response to condition detected by the application.

Figure 7:
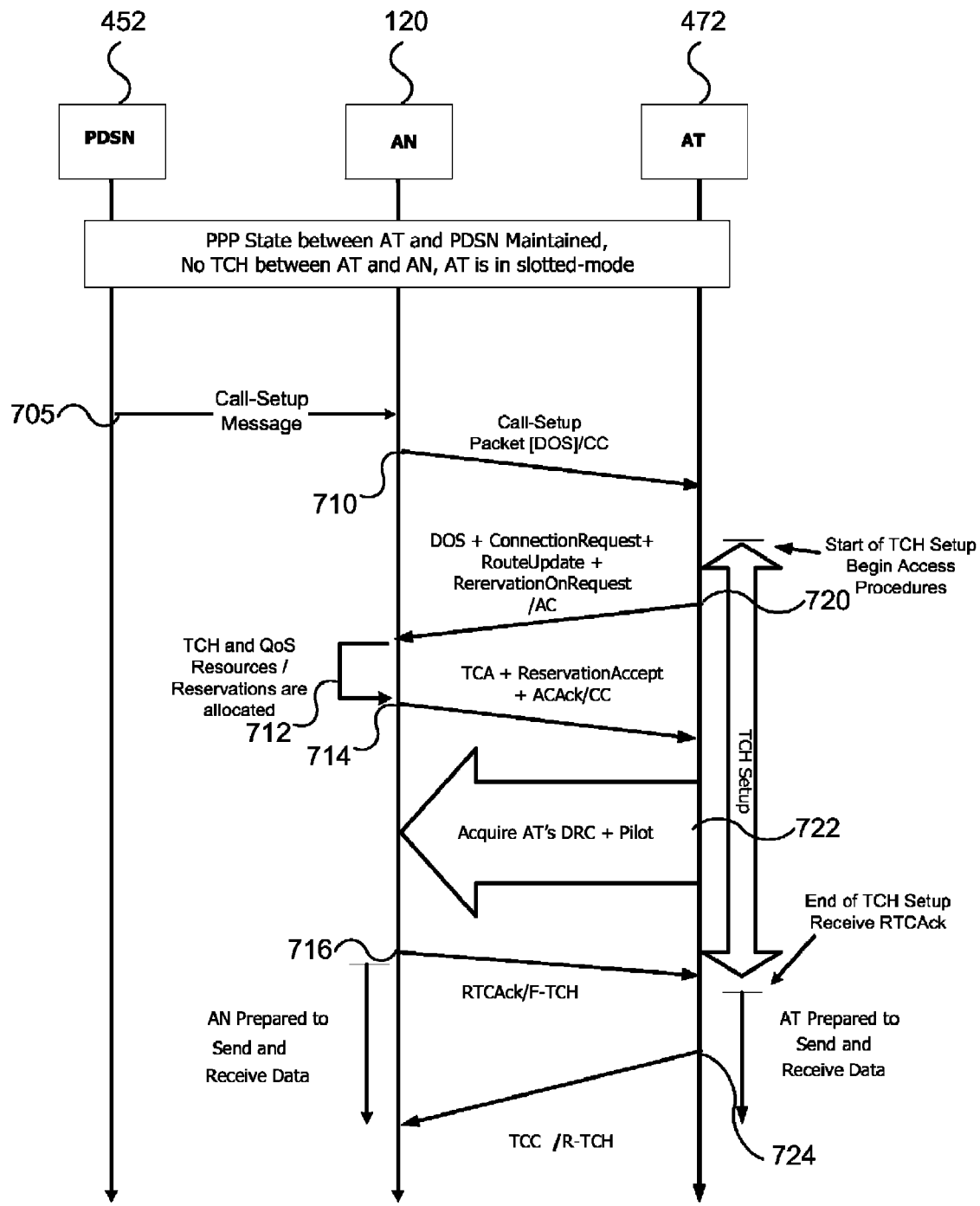
FIG. 7 is a signal flow diagram related to a target access terminal in accordance with at least one embodiment of the invention.

For example, as illustrated in FIG. 7, an access terminal (AT) 472, may receive a trigger, such as an announce message or call setup message, 705, in a PTT system. Specifically, a call setup message, 705, can be transmitted via PDSN 452 and AN 120. Access network 120 can forward the call setup message over a control channel, 710, to the target AT 472. Upon receipt and decoding of the call setup packet, AT 472 can determine that the requested communication (e.g., a PTT call) uses QoS resources. Accordingly, the call setup message received from the network can serve as a trigger to initiate the bundling of the subsequent response.

For example, AT 472 can respond with a bundled request, 720, including a connection request (e.g., ConnectionRequest,+RouteUpdate), a QoS reservation (e.g., ReservationOnRequest) and optionally an application layer message (e.g., DOS) on an access channel. Including the DOS allows for application data to be sent to a destination prior to establishing a traffic channel. Requesting the QoS resources allows for the allocation of the need QoS resources prior to establishing the traffic channel. Accordingly, the responsiveness of the communication system may be improved. Upon receipt of the connection request a traffic channel and requested resources can be allocated, 712, at access network (AN) 120. The traffic channel assignment (TCA), QoS resources acceptance, and acknowledgement of the access channel message can be transmitted, 714, to AT 472. The traffic channel setup can continue in 722, 716 and 724, until both the AN 120 and AT 472 are prepared to send and receive data as discussed in the foregoing and known in the art. Accordingly, a detailed explanation will not be provided.

High-Priority Call Handling

Embodiments of the invention described above with respect to FIGS. 3A through 7 are generally directed to implementations where each call has the same priority as other calls, or alternatively where the illustrated call flow is for a low-priority call. In other words, protocols for handling how to re-distribute system resources such that higher-priority calls can be accepted even where system resources cannot support those calls based on a current load or resource allocation (e.g., too many traffic channels have been assigned, etc.) have not yet been discussed. As used herein, a "resource" or system resource corresponds to any type of call support parameter that is allocated by the RAN 120 for supporting calls (e.g., a TCH, a QoS, a given amount of bandwidth, etc.). Rather, referring to FIG. 3C for example, if system resources (e.g., a TCH) is unavailable, the call is denied/rejected. Accordingly, embodiments that are directed to system resource re-distribution to accommodate higher-priority calls and/or a transport channel (e.g., by adding a SYN message for TCP, or INIT message when using SCTP) will now be described.

Figure 8:
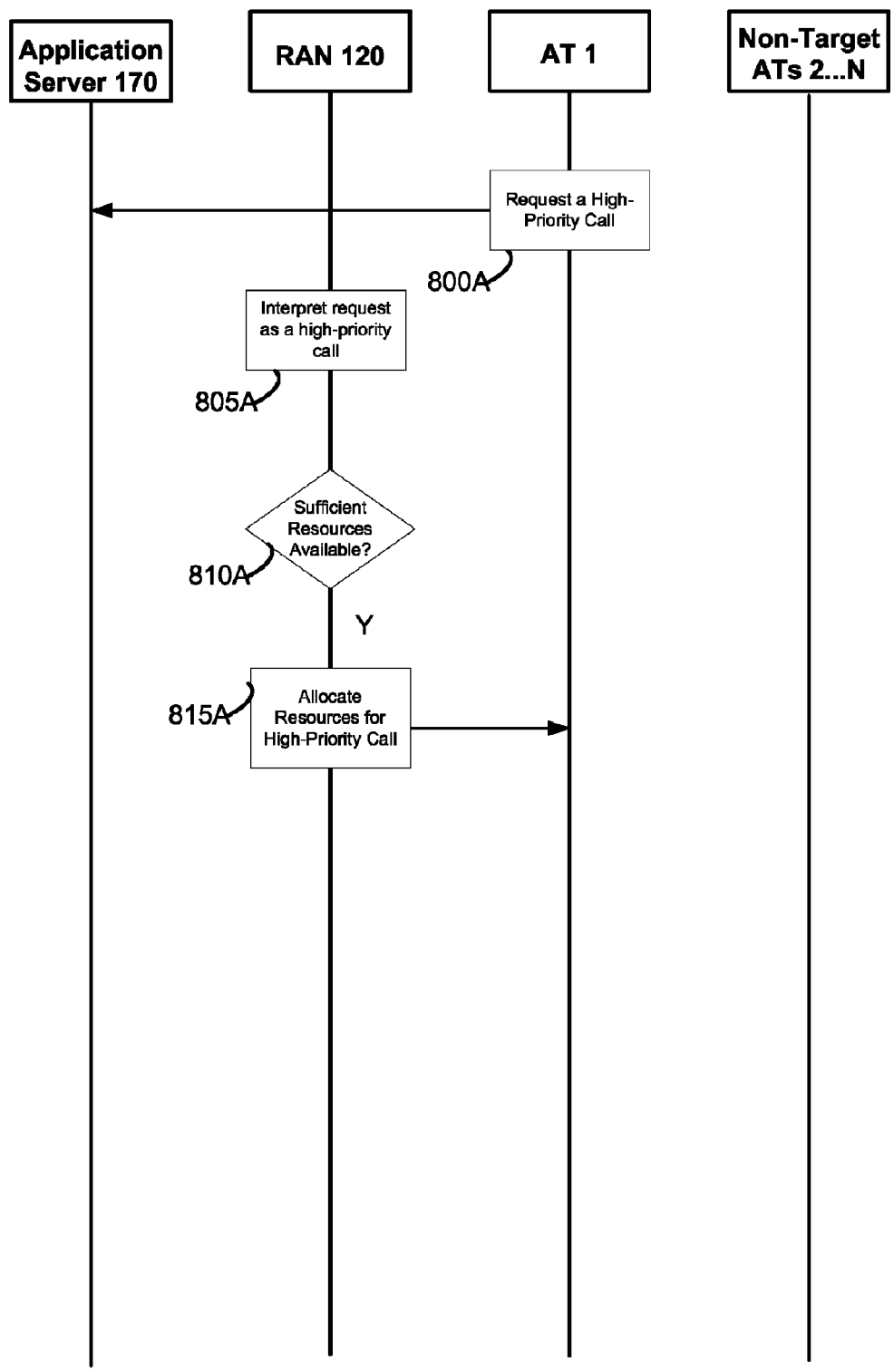
FIG. 8 illustrates a call set-up process for an initiator of a high-priority group call (e.g., a PTT call) where sufficient resources for handling the call are available within the initiator's sector according to an embodiment of the present invention.

FIG. 8 illustrates a call set-up process for an initiator of a high-priority group call (e.g., a PTT call) where sufficient resources for handling the call are available within the initiator's sector according to an embodiment of the present invention. As used herein, a "high priority" call is a call that has any priority higher than a default priority level for calls. For example, a high-priority call can correspond to a QChat Direct call, an Adhoc call, a Pre-defined Group Call, an Alert and/or any other call that a qualified user wishes to grant high-priority status. While embodiments of the invention are hereinafter described to a high-priority 'call', such as a PTT call, it will be appreciated that other embodiments of the invention can be directed to setting up other types of high-priority communication sessions, such as unicast calls, transport channels (e.g., by adding a SYN message for TCP or INIT message when using SCTP), etc.

Referring to FIG. 8, in 800A, the initiator ("AT 1") sends, to the RAN 120, a message requesting to initiate a high-priority call to one or more ATs. The RAN 120 receives the call request and forwards the call request to the application server 170. In 805A, the RAN 120 analyzes the received call request and interprets the request as a high-priority call. For example, the RAN 120 can check a flag contained in the call request that indicates whether the call request corresponds to a high-priority call, or alternatively the RAN120 can automatically associate high-priority status with certain access terminals (e.g., a security officer's phone, etc.).

In 810A, the RAN 120 determines whether sufficient system resources are available for handling the requested call in AT 1's sector. For example, the RAN 120 can check its current load based on the resources consumed by ATs 2 . . . N which are also within AT 1's sector in this example. For this embodiment, assume that sufficient resources are determined to be available in 810A. Therefore, in 815A, the RAN 120 allocates resources (e.g., a traffic channel, a QoS flow, etc.) to AT 1 for supporting the group call.

FIG. 8 is similar in certain respects FIG. 3A, in that sufficient resources (e.g., TCH and QoS) are available, such that the call request is accepted by the RAN 120. Thus, in the example of FIG. 8, a high-priority call is treated in substantially the same manner as a low or default priority call when system resources are abundant (i.e., the resources are allocated to the high-priority AT without de-allocating resources from other, lower-priority ATs). Thus, while the process of FIG. 8 performs the evaluation or interpretation as to whether the requested call is for a high-priority call in 805A, in an alternative embodiment, this evaluation can be performed only after the resource determination of 810A because if resources are available, the high-priority call is treated similar to a low-priority call. Examples will now be provided regarding resource re-distribution when system resources are not available for a high-priority call.

In embodiments of the invention, Priority Access Call Admission (PACA) and/or non-PACA implementations (e.g., in EV-DO systems) can be deployed where a high-priority multicast call (or other type of communication session, such as a unicast call or transport channel setup, or messaging that concurrently sets up a unicast call and a transport channel, such as transport channel establishment via a DOS message in addition to the CALL message which is sent in another DOS message in the same bundle) is allocated bandwidth and other resources at the application server 170 and/or the RAN 120 at the expense of other lower-priority calls that are in process within the wireless communications system 100. Also, while the examples below are directed to a two-priority level implementation, referred to as "high" priority and "low" priority, in other embodiments of the invention more than two priorities can be implemented, as will be appreciated by one of ordinary skill in the art. In this case, "high" priority and "low" priority are relative such that high priority is above low priority, but is not necessarily a highest available priority, just as low priority is not necessarily a lowest available priority. While FIGS. 9A. through 9C are described to a high-priority 'call', such as a PTT call, it will be appreciated that other embodiments of the invention can be directed to setting up other types of high-priority communication sessions, such as unicast calls, transport channels (e.g., by adding a SYN message for TCP or INIT message when using SCTP), etc.

Figure 9A:
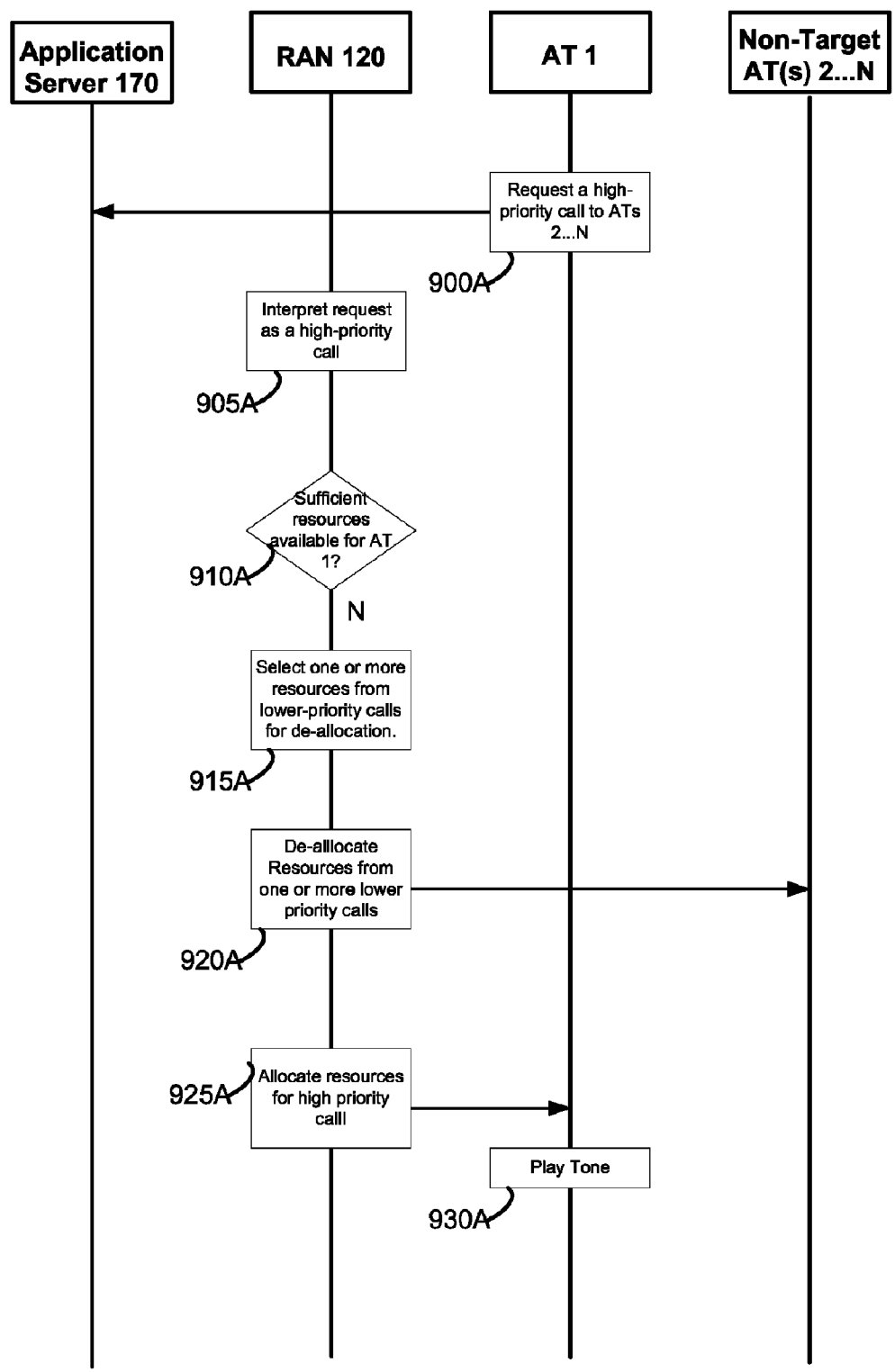
FIG. 9A illustrates a call set-up process for an initiator of a high-priority group call where sufficient resources for handling the call are not available within the initiator's sector according to an embodiment of the present invention.

FIG. 9A illustrates a call set-up process for an initiator of a high-priority group call (e.g., a PTT call) where sufficient resources for handling the call are not available within the initiator's sector according to an embodiment of the present invention. In 900A, the initiator ("AT 1") sends, to the RAN 120, a message requesting to initiate a high-priority group call to one or more other ATs. The RAN 120 receives the call request and forwards the call request to the application server 170. In 905A, the RAN 120 analyzes the received call request and interprets the request as a high-priority call. For example, the RAN 120 can check a flag contained in the call request that indicates whether the call request corresponds to a high-priority call.

In 910A, the RAN 120 determines whether sufficient system resources are available for handling the requested call in AT 1's sector. For example, the RAN 120 can check its current load (e.g., a number of allocated TCHs and/or QoS resources) based on the resources consumed by ATs 2 . . . N which are also within AT 1's sector in this example. For this embodiment, assume that sufficient resources are determined not to be available in 910A.

In 915A, instead of rejecting or denying the call request (e.g., as in FIG. 3C) due to the lack of resources to handle the high-priority group call for AT 1, the RAN 120 selects one or more resources from lower-priority calls for de-allocation (e.g., assuming that all other resources are not allocated for high priority calls). For example, the RAN 120 may select a given amount of resources (e.g., TCHs and/or QoSs) from randomly selected ATs among ATs 2 . . . N that are engaged in lower-priority calls for de-allocation (e.g., cancellation or reduction), such that a threshold amount of resources for AT 1's high priority group call is made available. As used herein, the de-allocation selection may correspond to a complete de-allocation (e.g., to remove all previously assigned QoS resources, traffic channels, etc.) or a partial de-allocation (e.g., to remove less than all previously assigned QoS resources such that the AT for which de-allocation is selected has a lower QoS guarantee, fewer traffic channels, etc.) . . . Next, in 920A, the RAN 120 sends instructions to the randomly selected ATs among ATs 2 . . . N to de-allocate (e.g., reduce or cancel) previously allocated resources (e.g., a TCH only, a TCH and QoS, etc.). After the de-allocation of 920A, the RAN 120 allocates, at least partially, the de-allocated and newly available resources for the high-priority group call to AT 1, 925A. In 930A, a tone or alert message is played at AT 1 in response to the resource allocation, indicating that AT 1 can begin speaking (e.g., after one or more target ATs accept the call, not shown in FIG. 9A).

Figure 9B:
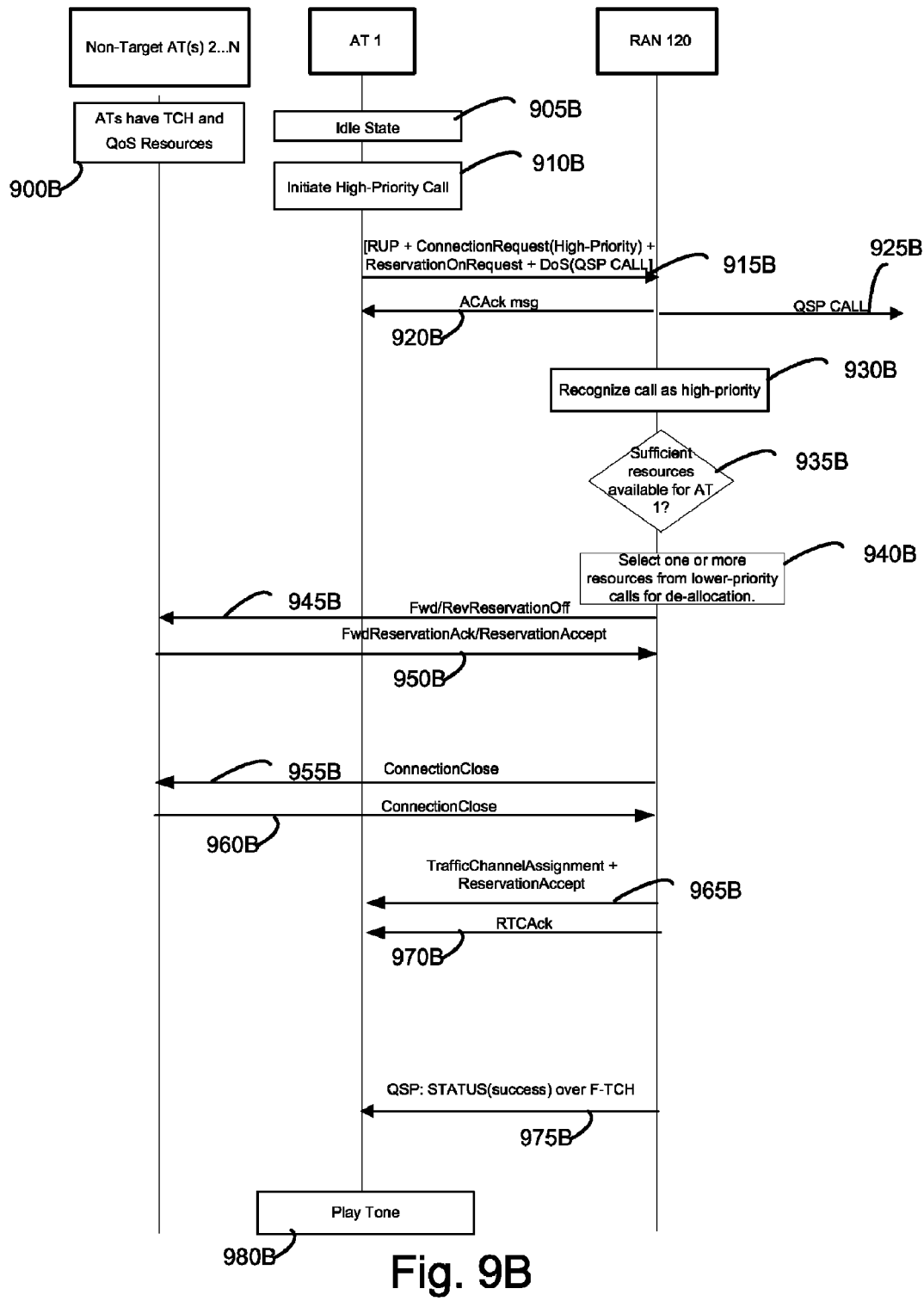
FIG. 9B illustrates an example of the process of FIG. 9A implemented within a 1xEV-DO Rev. A system.
Figure 9C:
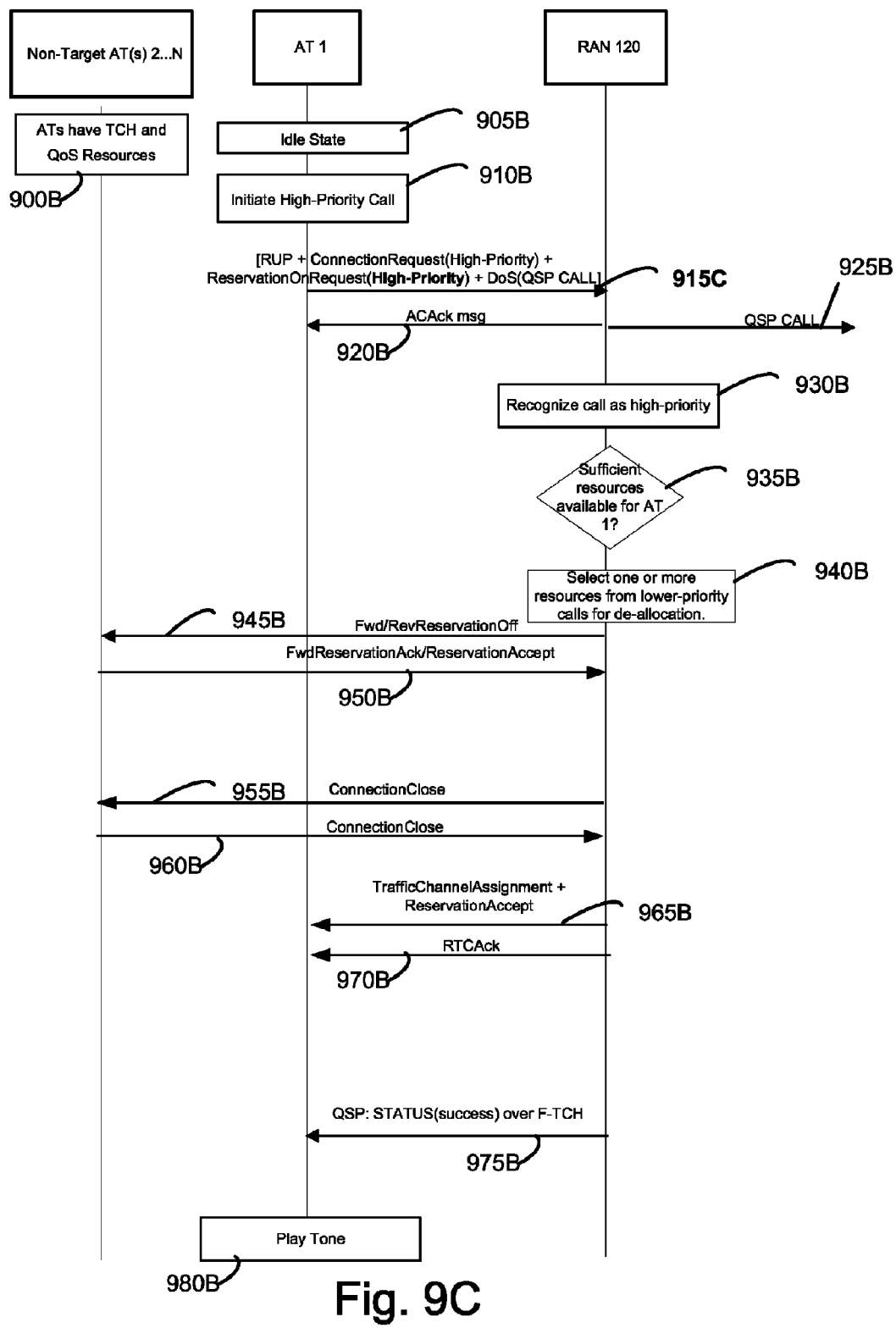
FIG. 9C illustrates an example of the process of FIG. 9A implemented within a 1xEV-DO Rev. B system.

Above, FIG. 9A has been described at a relatively high level that is applicable across many different wireless communication protocols. Below, FIGS. 9B and 9C illustrate example implementations of the process of FIG. 9A within 1xEV-DO Rev. A and 1xEV-DO Rev. B, respectively.

Accordingly, referring to FIG. 9B, assume that ATs 2 ... N, which are not targets of the group call and are located in the same sector as AT 1, are allocated TCH and/or QoS resources associated with low-priority calls, 900B. In 905B, AT 1 is in an idle state, and AT 1 exits the idle state and determines to request or initiate a high-priority call (e.g., an emergency call), 910B. For example, the determination of 910B can be in response to a user of AT 1 pushing a PTT button for calling a high-priority PTT group.

Accordingly, in 915B, AT 1 configures a ConnectionRequest message with a flag for indicating a high-priority call (e.g., alternatively referred to as 'Emergency', although the call itself need not be a 911-type Emergency call), and transmits the configured ConnectionRequest message (e.g., ConnectionRequest,+RouteUpdate), a QoS reservation (e.g., ReservationOnRequest) and optionally an application layer message (e.g., DOS) on a reverse link access channel (e.g., similar to 720 of FIG. 7). However, unlike 720 of FIG. 7, the ConnectionRequest is configured to convey the high-priority status of the requested call. For example, one or more unused field settings in the ConnectionRequest message can be used to convey high-priority status, such as the 4-bit RequestReason field which conventionally conveys only two settings; namely, whether the call request is AT or RAN initiated. In an example, the RequestReason field in the ConnectionRequest message can be set to indicate either high or low priority, or alternatively a specific priority level (e.g., level 0, level 1, level 2, etc.). Again, because the 4-bit RequestReason field is conventionally used only to convey two (2) settings (i.e., AT or RAN initiated), 14 (i.e., $2^4-2$) different priority levels can potentially be indicated by the remaining unused bits. In an alternative example, the 4-bit Reserved field in the ConnectionRequest message can be used to convey the priority level (e.g., in place of or in addition to the RequestReason field).

In another alternative example, the call request signaling message (i.e., DOS (QSP CALL)) may have a given special Diffserv Code Point (DSCP) in a header portion configured to convey high priority status to the RAN 120 and/or the application server 170. For example, DSCPs can be used for Mobile-Originated calls if the RAN performs the framing/deframing of application layer packets. This is because the framing protocol, when using DOS over EMFPA in EV-DO systems, the IP header is a fixed offset in bytes from the end of the DOS message. Therefore, the RAN can peek into the IP header directly, even though it is technically at the application layer. As will be appreciated, in this manner, DSCP values can potentially be used to convey information both to the RAN 120 and the application server 170.

Alternatively, instead of using fields already defined by the standard (e.g., in this case, 1xEV-DO Rev. A), AT 1 and RAN 120 can each agree to use a proprietary QoS ProfileID to indicate the priority status of the call. Thus, in this example, when AT 1 requests the high-priority call in 915B, the RAN 120 determines that the call is a high-priority call based on a ReservationLabel associated with the QoS ProfileID that indicates high-priority status. However, it will be appreciated that this alternative embodiment may require the client device, or AT 1, to manage its configuration of resources with the RAN 120 and activate them during the onset of a group call. As will be appreciated, 910B and 915B of FIG. 9B may correspond to 900A of FIG. 9A.

After receiving the bundled ConnectionRequest message on the access channel, the RAN 120 sends AT 1 an acknowledgment to the access message (ACAck), 920B, and forwards the application layer message (e.g., DOS) to the application server 170, 925B.

In 930B, the RAN 120 analyzes the received ConnectionRequest message and determines that the call request is for a high-priority call. For example, the RAN 120 can extract a flag contained in a RequestReason field, a DSCP value of a DOS (QSP CALL) signaling message, a Reserved field and/or within a ReservationLabel associated with a QoS ProfileID to determine the high priority status (e.g., again, if more than two priority levels are established, the 'high' priority level can be any priority level above the lowest level of priority. As will be appreciated, 930B of FIG. 9B may correspond to 905A of FIG. 9A.

In 935B, the RAN 120 determines whether sufficient system resources are available for handling the requested call in AT 1's sector. For example, the RAN 120 can check its current load (e.g., a number of allocated TCHs and/or QoS resources) based on the resources consumed by ATs 2 ... N which are also within AT 1's sector in this example. For this embodiment, assume that sufficient resources are determined not to be available in 935B. As will be appreciated, 935B of FIG. 9B may correspond to 910A of FIG. 9A.

Next, 940B, the RAN 120 selects one or more resources from lower-priority calls associated with ATs 2 ... N for de-allocation (e.g., assuming that all other resources are not allocated for high priority calls). As discussed above with respect to 915A of FIG. 9A, the de-allocation selection may correspond to a complete de-allocation (e.g., to remove all previously assigned QoS resources, traffic channels, etc.) or a partial de-allocation (e.g., to remove less than all previously assigned QoS resources such that the AT for which de-allocation is selected has a lower QoS guarantee, fewer traffic channels, etc.). Further, as will be appreciated, in an example, the RAN 120 can select only a TCH for de-allocation, or can select both a TCH and a QoS resource for de-allocation. For example, if ReservationKKIdleStateFwd/Rev=1 or 2 for the lower priority QoS flows from which the resource(s) are to be de-allocated, then the RAN 120 need not turn off QoS reservations but rather just tear down, or de-allocate, the TCH.

After making the de-allocation selection, the RAN 120 de-allocates QoS resources by sending a FwdRevReservationOff message to the selected AT(s), 945B, receiving an acknowledgment ("FwdRevReservationAccept") to the FwdRevReservationOff message, 950B. As discussed above, 945B and 950B are optional in the sense that, if ReservationKKIdleStateFwd/Rev=1 or 2 for the lower priority QoS flows from which the resource(s) are to be de-allocated, the RAN 120 need not turn off QoS reservations in order to support the high-priority call. The RAN 120 also tears down one or more TCH(s) by sending a ConnectionClose message to the selected AT(s), 955B, and receives a ConnectionClose message from the selected AT(s), 960B. As will be appreciated, 940B of FIG. 9B corresponds to 915A of FIG. 9A, and 945B through 960B of FIG. 9B correspond to 920A of FIG. 9A.

After the de-allocation of resources, the RAN 120 allocates resources for the high-priority call to AT 1 by sending TrafficChannelAssignment and ReservationAccept messages to AT 1, 965B, and also sending a Reverse Traffic Channel Acknowledge (RTCAck) message to AT1, 970B. As will be appreciated, 965B and 970B of FIG. 9B correspond to 925A of FIG. 9A. Then, after receiving an indication that the call has been accepted by at least one other AT from the application server 170, the RAN 120 transmits a QSP: STATUS (success) message to AT 1 over the F-TCH, 975B. In response to this message, AT 1 plays a tone, 980B, notifying a user of AT 1 that he/she may begin speaking to at least one target AT. As will be appreciated, 980B of FIG. 9B correspond to 930A of FIG. 9A.

FIG. 9C illustrates a variation to the process of FIG. 9B that is adapted for 1xEV-DO Rev. B. Referring to FIG. 9C, FIG. 9C corresponds FIG. 9B except that the call request of 915B has been replaced by a different call request 915C in FIG. 9C. Accordingly, for the sake of brevity, an additional description of the redundant aspects from FIG. 9B has been omitted in the description of FIG. 9C.

Accordingly, with respect to 915C of FIG. 9C, AT 1 configures a call request message with a flag for indicating a high-priority status of the call, and transmits the configured call request message to the RAN 120. In 1xEV-DO Rev. B, the ConnectionRequest message and ReservationOnRequest message each contain an EmergencyIndicator bit that can be set to a given logic level (e.g., a higher logic level or "1") to indicate high-priority status.

While a single bit in the ConnectionRequest only allows for one priority level, which may in fact be used by E-911 services when VoIP is part of the handset, the 1-bit field in the ReservationOnRequest message may provide a greater degree of flexibility in indicating call priority to the RAN 120. In this example, the Emergencyindicator bit can be set to a first logic level (e.g., a lower logic level or "0") for low-priority calls and a second logic level (e.g., a higher logic level or "1") for priority calls. Accordingly, existing QoS In-call Signaling and Media IP flows can be used to convey high-priority call status 1xEV-DO Rev. B. Alternatively, as in 1xEV-DO Rev. A, instead of using fields already defined by the standard (e.g., in this case, 1xEV-DO Rev. B), AT 1 and RAN 120 can each agree to use a proprietary QoS ProfileID to indicate the priority status of the call, as described above.

While FIGS. 8 through 9C have been directed to ensuring that initiators of high-priority calls (e.g., Mobile-Originated High Priority Calls) have sufficient resources to conduct the call, it is also important to ensure that target ATs participating in a high-priority call (e.g., Mobile-Terminated High Priority Calls) are guaranteed resources (e.g., TCH and/or QoS resources). Accordingly, embodiments will now be described where target ATs for a high-priority group call are allocated sufficient resources for the call irrespective of whether those resources are initially available.

Figure 10A:
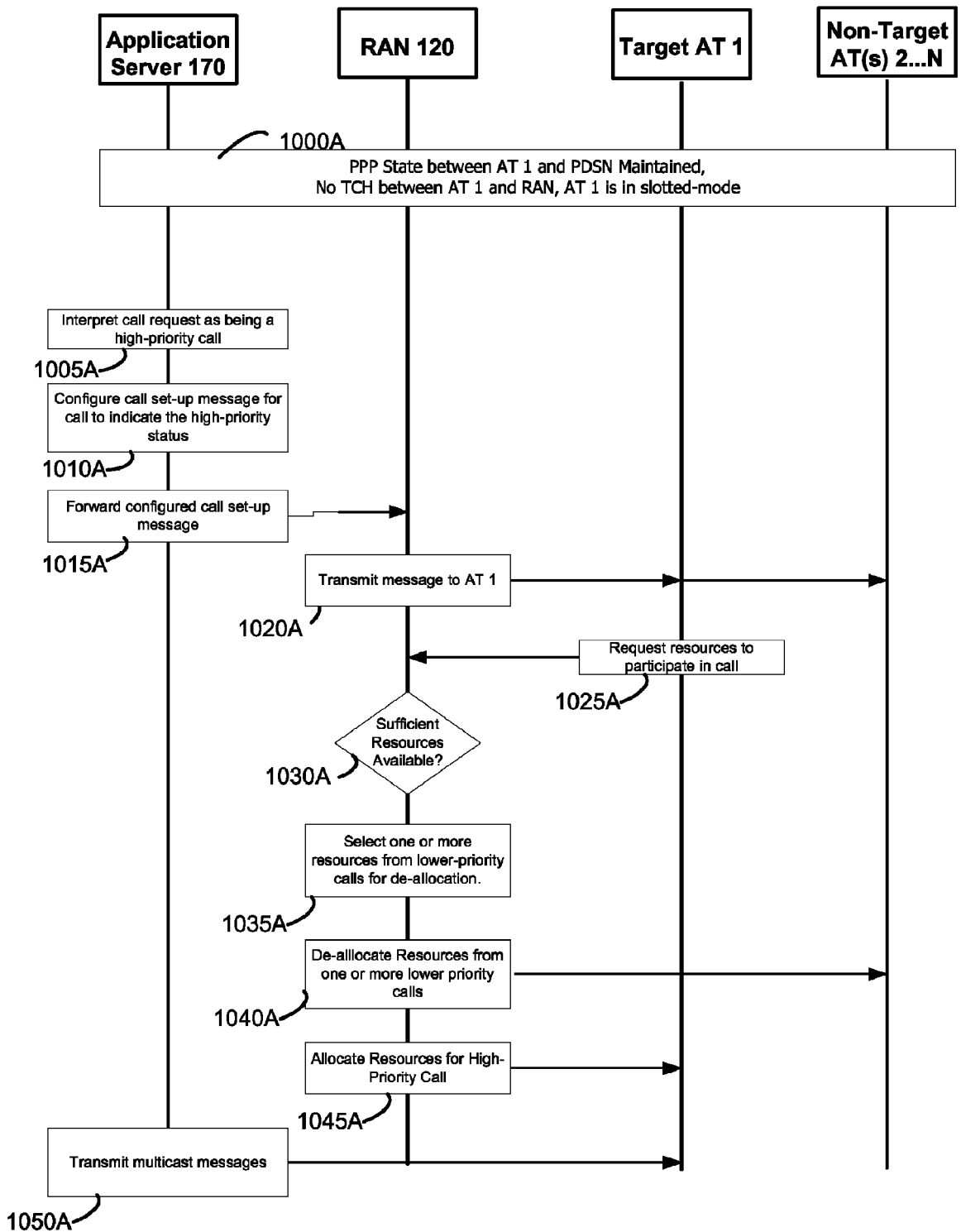
FIG. 10A illustrates a call set-up process for a target access terminal of a high-priority group call where sufficient resources for handling the call are not available within the target access terminal's sector according to an embodiment of the present invention.

Referring to FIG. 10A, AT 1 corresponds to a target AT (e.g., unlike FIGS. 8, 9A, 9B or 9C, where AT 1 corresponded to the call initiator) for a group call (e.g., which may be initiated as in FIGS. 8 (e.g., via a flag contained in a signaling message to the application server 170, such as the call request message in 900A, or via a DSCP value of the call request packet), 1005A. Next, the application server 170 configures a call set-up message for the call that indicates its associated high-priority status, 1010A, and forwards the configured call set-up message to the RAN 120, 1015A. The RAN 120 receives the configured call set-up message, and transmits a message (e.g., an announce message, a page for target AT 1, etc.) at least to target AT 1 within target AT 1's sector, 1020A, and receives a request for resources to participate in the call from the target AT 1 in response to the call set-up message, 1025A. At this point, assume the RAN 120 is aware that the request for resources received at 1025A is associated with a high-priority call. As will be described below in greater detail, the RAN 120 may become aware of the high-priority status based on a flag contained either within the configured call set-up message from the application server 170 in 1015A, or a flag within the request for resources from the target AT 1 in 1025A.

Next, the RAN 120 determines whether sufficient resources are available for allocation to the target AT 1, 1030A. If sufficient resources are available, the resources are allocated to target AT 1, as in 815A of FIG. 8 with respect to AT 1 as call initiator. Otherwise, the RAN 120 selects one or more resources from one or more of ATs 2 . . . N for de-allocation (e.g., a TCH only, a TCH and QoS, etc.), 1035A, sends instructions to facilitate the de-allocation of the resources from the selected ATs, 1040A, and allocates resources to target AT 1, 1045A. As discussed above with respect to other embodiments of the invention, the de-allocation selection may correspond to a complete de-allocation (e.g., to remove all previously assigned QoS resources, traffic channels, etc.) or a partial de-allocation (e.g., to remove less than all previously assigned QoS resources such that the AT for which de-allocation is selected has a lower QoS guarantee, fewer traffic channels, etc.).

In FIG. 10A, 1035A, 1040A and 1045A generally correspond to 915A, 920A and 925A of FIG. 9A, and as such will not be described further for the sake of brevity. After the target AT 1 accepts the call (e.g., in 1025A, or if 1020A is a standard page, then after the RAN 120 transmits an announce message), the RAN 120 notifies the application server 170, which grants the floor to the call initiator and begins forwarding group messages, 1050A, to the RAN 120 for transmission to one or more target ATs including target AT 1 over the allocated resources from 1045A.

Figure 10B:
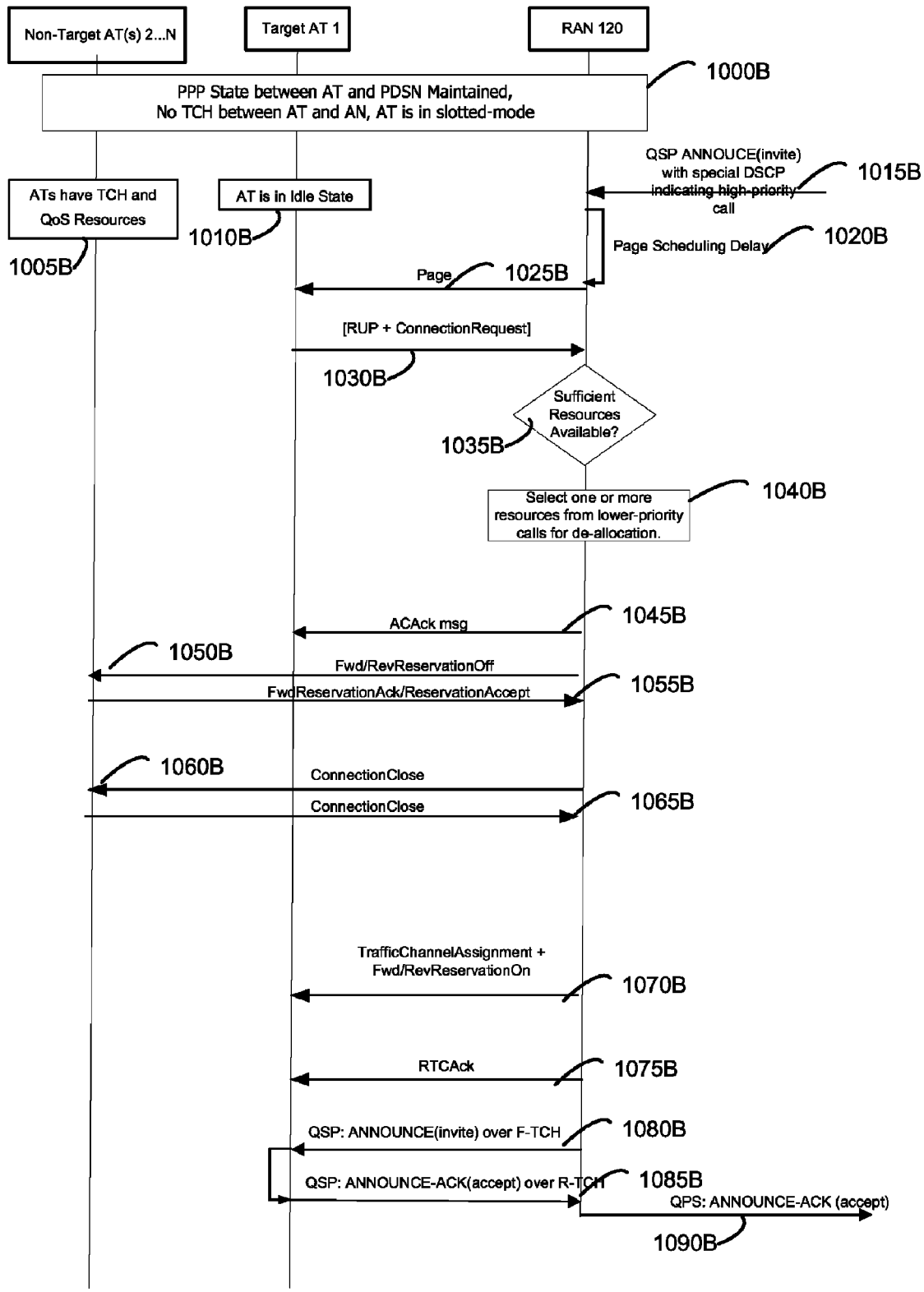
FIG. 10B illustrates an example of the process of FIG. 10A where an announce message is sent to the target access terminal after the target access terminal is paged.
Figure 10C:
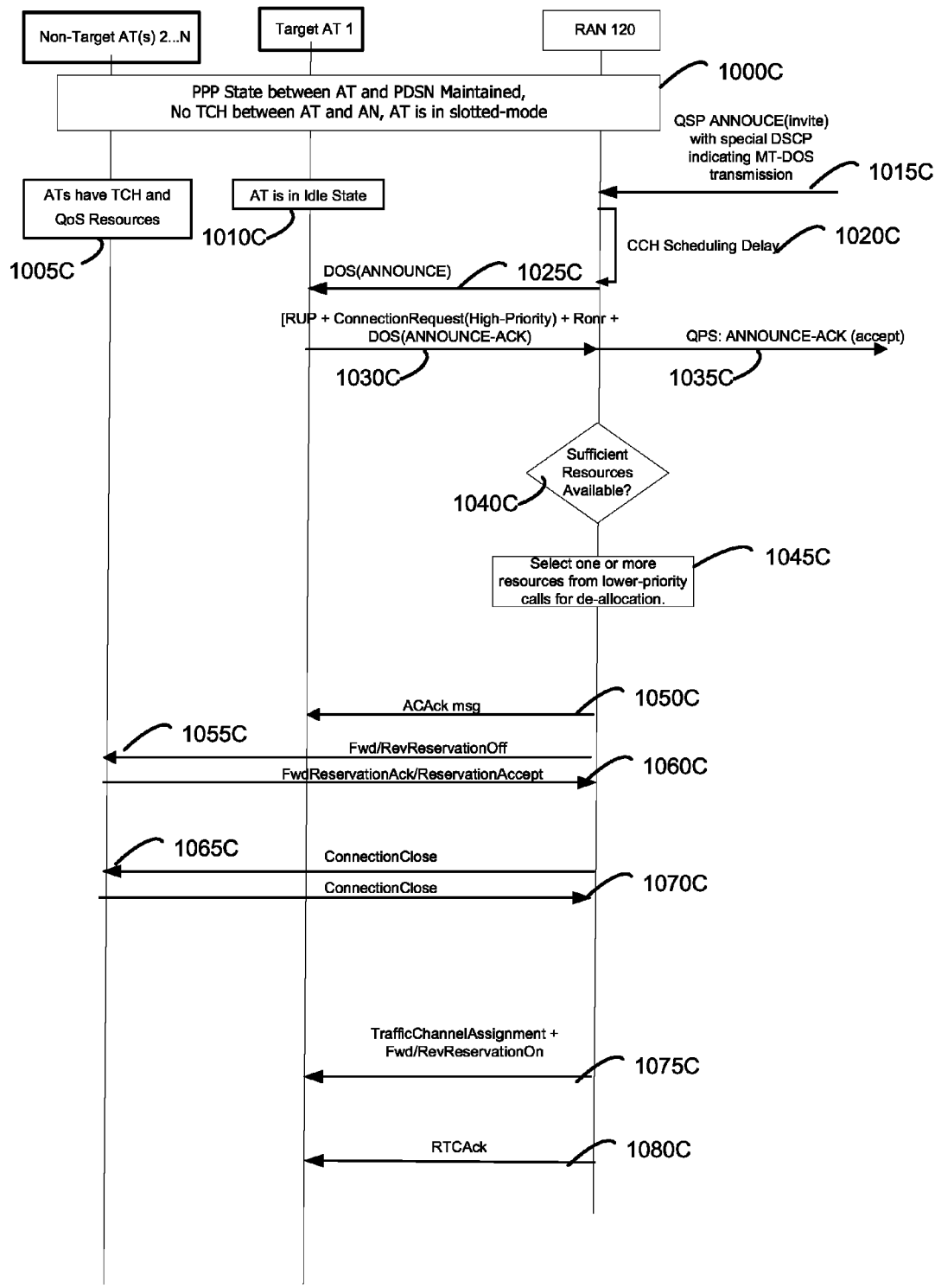
FIG. 10C illustrates an example of the process of FIG. 10A where the announce message is bundled within a data-over-signaling (DOS) message and transmitted to the target access terminal on a downlink control channel.

Above, FIG. 10A has been described at a relatively high level that is applicable across many different wireless communication protocols. Below, FIGS. 10B and 10C illustrate alternative implementations of the process of FIG. 10A in more detail. The example implementations of FIGS. 10A and 10B may be implemented within either 1xEV-DO Rev. A or 1xEV-DO Rev. B.

With respect to FIG. 10B, 1000B corresponds to 1000A of FIG. 10A, and as such will not be described further for the sake of brevity, except to mention that the same assumptions made in FIG. 10 A are also present in FIG. 10B. In 1005B, it may be further assumed that one or more of non-target ATs 2 . . . N have already been allocated TCH and/or QoS resources, and that target AT 1 is in an idle state and has not yet been allocated TCH or QoS resources, 1010B.

In 1015B, the RAN 120 receives, from the application server 170 (not shown), an announce message for announcing a group call, denoted as QSP ANNOUNCE(invite). The announce message received at 1015B further includes a flag (e.g., a special Diffserv Code Point (DSCP) value of the IP header of the announce message) that the RAN 120 interprets as indicating high priority status. Thus, in the example of FIG. 10B, assume that upon receiving the announce message with the flag (e.g., special DSCP value) set to indicate high-priority status, the RAN 120 is aware that the announce message is for a high-priority call.

After a page scheduling delay, 1020B, the RAN 120 pages target AT 1, 1025B. In an example, because the RAN 120 is aware that the announce message is for a high-priority call, the RAN 120 can expedite the page transmission of 1025B by placing the page ahead of other queued pages for low-priority calls. After receiving the page in 1025B, target AT 1 becomes aware that the RAN 120 is attempting to send a message to target AT 1, and target AT 1 responds to the page with a request for resources (e.g., RUP+ConnectionRequest) on a reverse link access channel, 1030B. It is worth noting that the request for resources transmitted in 1030B need not include a high-priority flag (e.g., a RequestReason and/or Reserved field within the ConnectionRequest message) because at least within this example, the flag (e.g., special DSCP value) of the announce message is sufficient to convey the high-priority status to the RAN 120. However, it is still possible target AT 1 can indicate the high-priority status I the resource request message of 1030B.

In 1035B, the RAN 120 checks to see whether sufficient resources are available for allocating to target AT 1 for the call. As noted above, if sufficient resources are available, the resources are simply allocated. Otherwise, if sufficient resources are not available, because the RAN 120 is aware that the announce message received at 1015B is a high priority call, the RAN 120 selects one or more resources from lower-priority calls associated with ATs 2 . . . N for de-allocation, 1040B (e.g., assuming that all other resources are not allocated for high priority calls). As discussed above with respect to other embodiments of the invention, the de-allocation selection may correspond to a complete de-allocation (e.g., to remove all previously assigned QoS resources, traffic channels, etc.) or a partial de-allocation (e.g., to remove less than all previously assigned QoS resources such that the AT for which de-allocation is selected has a lower QoS guarantee, fewer traffic channels, etc.). Further, as will be appreciated, in an example, the RAN 120 can select only a TCH for de-allocation, or can select both a TCH and a QoS resource for de-allocation. For example, if ReservationK-KIdleStateFwd/Rev=1 or 2 for the lower priority QoS flows from which the resource(s) are to be de-allocated, then the RAN 120 need not turn off QoS reservations but rather just tear down, or de-allocate, the TCH.

The RAN 120 can acknowledge the access message from 1030B by sending an ACAck message, 1045B, but cannot yet allocate resources to target AT 1. Accordingly, after making the de-allocation selection, the RAN 120 de-allocates QoS resources by sending a FwdRevReservationOff message to the selected AT(s), 1050B, receiving an acknowledgment ("FwdRevReservationAccept") to the FwdRevReservation-Off message, 1055B. As discussed above, 1050B and 1055B are optional in the sense that, if ReservationKKIdleStateFwd/Rev=1 or 2 for the lower priority QoS flows from which the resource(s) are to be de-allocated, the RAN 120 need not turn off QoS reservations in order to support the high-priority call. The RAN 120 also tears down one or more TCH(s) by sending a ConnectionClose message to the selected AT(s), 1060B, and receives a ConnectionClose message from the selected AT(s), 1065B.

After the de-allocation of resources, the RAN 120 allocates resources for the high-priority call to target AT 1 by sending TrafficChannelAssignment and FwdRevReservationOn messages to target AT 1, 1070B, and also sending a Reverse Traffic Channel Acknowledge (RTCAck) message to target AT 1, 1075B. After assigning the traffic channel to target AT 1, the RAN 120 transmits the announce message over the F-TCH, 1080B, and target AT 1 responds by accepting the announced call over the R-TCH, 1085B. The RAN 120 forwards the announce acknowledgment to the application server 170, which can then begin transmitting group (e.g., multicast) messages to target AT 1 from the call initiator, 1090B. For clarity, it may be noted that, within FIGS. 10A and 10B, 1000B corresponds to 1000A, 1015B corresponds to 1015A, 1025B corresponds to 1020A, 1030B corresponds to 1025A, 1035B corresponds to 1030A, 1040B corresponds to 1035A, 1050B, 1055B, 1060B and 1065B correspond to 1040A, and 1070B corresponds to 1045A.

While FIG. 10B is directed to a standard paging process wherein a target AT is paged, a traffic channel is established, and then an announce message is transmitted over the established traffic channel, another potentially faster way of announcing a call to an AT is by packaging the announce message within a data-over-signaling (DOS) message and transmitting the DOS message over a downlink control channel (CCH) within a control channel capsule (e.g., a synchronous, sub-synchronous and/or asynchronous control channel capsule). Sending announce messages over the control channel within a DOS message is described in more detail within U.S. Provisional Application No. 60/974,833, entitled "MULTICAST MESSAGING WITHIN A WIRELESS COMMUNICATION SYSTEM", filed on Sep. 24, 2007, assigned to the assignee of the subject application and hereby incorporated by reference in its entirety, and also within U.S. Non-Provisional application No. Ser. No. 12/242,444, entitled "METHODS OF ANNOUNCING A CALL TO AN ACCESS TERMINAL IN A WIRELESS COMMUNICATIONS SYSTEM", filed on Sep. 30, 2008, assigned to the assignee of the subject application and hereby incorporated by reference in its entirety.

Accordingly, FIG. 10C, which will now be described in greater detail, is directed to an implementation wherein the announce message for the high-priority call is transmitted over the control channel within a DOS message.

With respect to FIG. 10C, 1000C corresponds to 1000A of FIG. 10A, and as such will not be described further for the sake of brevity, except to mention that the same assumptions made in FIG. 10A are also present in FIG. 10C. In 1005C, it may be further assumed that one or more of non-target ATs 2 . . . N have already been allocated TCH and/or QoS resources, and that target AT 1 is in an idle state and has not yet been allocated TCH or QoS resources, 1010C.

In 1015C, the RAN 120 receives, from the application server 170 (not shown), an announce message for announcing a group call, denoted as QSP ANNOUNCE(invite). The announce message received at 1015C further includes a flag as (e.g., a special Diffserv Code Point (DSCP) value of the IP header of the announce message) that the RAN 120 interprets as an instruction for transmitting the announce message as a DOS message over the downlink CCH. In an example, the RAN 120 is not necessarily aware that the announce message is for a high-priority call, but does know to transmit the announce message on the downlink CCH as a DOS message, which is a quicker way to transmit announce messages that consumes more resources on the downlink CCH. In an alternative example, the RAN 120 can be configured to assume that any announce message transmitted on the downlink CCH in a DOS message is for a high-priority call.

After a CCH scheduling delay, 1020C, the RAN 120 sends the announce message within a DOS message on the downlink CCH at least to target AT 1, 1025C. In an example, the RAN 120 can expedite the DOS message transmission of 1025C by placing the DOS message ahead of other queued CCH messages for low-priority calls. After receiving the DOS message in 1025C, target AT 1 determines to accept the announce call in 1030C also determines, because the announce message is transmitted as a DOS message on the downlink CCH, that the call is a high-priority call. Accordingly, target AT 1 transmits a request for resources and announce ACK indicating the high-priority status of the call (e.g., RUP+ConnectionRequest(High-Priority)+ReservationOnRequest+DOS(ANNOUNCE-ACK)) on a reverse link access channel, 1030C. It will be appreciated that the bundled message of 1030C is described as having the ConnectionRequest indicate the high-priority status of the call (e.g., within a Reserve field and/or RequestReason field), as if the implementation were within a 1xEV-DO Rev. A system as described above with respect 915B of FIG. 9B. In an alternative embodiment, the ReservationOnRequest can be used to indicate the high priority status within a 1xEV-DO Rev. B system, as described above with respect to 915C of FIG. 9C. Alternatively, a proprietary QoS ProfileID can be used in either system to convey the high-priority status. In yet another example, the high-priority status need not be conveyed to the RAN 120 at all in the message of 1030C if the RAN 120 is configured to interpret any DOS announce message as having a high-priority. In any case it may be assumed that after the RAN 120 receives the message of 1030C, the RAN 120 is aware of the high-priority call status. After receiving the announce ACK, the RAN 120 forwards the announce acknowledgment to the application server 170, which can then begin transmitting group messages to target AT 1 from the call initiator, 1035C.

In 1040C, the RAN 120 checks to see whether sufficient resources are available for allocating to target AT 1 for the call. As noted above, if sufficient resources are available, the resources are simply allocated. Otherwise, if sufficient resources are not available, because the RAN 120 is aware that the announce message received at 1015C is for a high priority call, the RAN 120 selects one or more resources from lower-priority calls associated with ATs 2 . . . N for de-allocation, 1045C (e.g., assuming that all other resources are not allocated for high priority calls). As discussed above with respect to other embodiments of the invention, the de-allocation selection may correspond to a complete de-allocation (e.g., to remove all previously assigned QoS resources, traffic channels, etc.) or a partial de-allocation (e.g., to remove less than all previously assigned QoS resources such that the AT for which de-allocation is selected has a lower QoS guarantee, fewer traffic channels, etc.). Further, as will be appreciated, in an example, the RAN 120 can select only a TCH for de-allocation, or can select both a TCH and a QoS resource for de-allocation. For example, if ReservationK-KIdleStateFwd/Rev=1 or 2 for the lower priority QoS flows from which the resource(s) are to be de-allocated, then the RAN 120 need not turn off QoS reservations but rather just tear down, or de-allocate, the TCH.

The RAN 120 can acknowledge the access message from 1030C by sending an ACAck message, 1050C, but cannot yet allocate resources to target AT 1. Accordingly, after making the de-allocation selection, the RAN 120 de-allocates QoS resources by sending a FwdRevReservationOff message to the selected AT(s), 1055C, receiving an acknowledgment ("FwdRevReservationAccept") to the FwdRevReservationOff message, 1060C. As discussed above, 1055C and 1060C are optional in the sense that, if ReservationKKIdleStateFwd/Rev=1 or 2 for the lower priority QoS flows from which the resource(s) are to be de-allocated, the RAN 120 need not turn off QoS reservations in order to support the high-priority call. The RAN 120 also tears down one or more TCH(s) by sending a ConnectionClose message to the selected AT(s), 1065C, and receives a ConnectionClose message from the selected AT(s), 1070C.

After the de-allocation of resources, the RAN 120 allocates resources for the high-priority call to target AT 1 by sending TrafficChannelAssignment and FwdRevReservationOn messages to target AT 1, 1075C, and also sending a Reverse Traffic Channel Acknowledge (RTCAck) message to target AT 1, 1080C. For clarity, it may be noted that, within FIGS. 10A and 10C, 1000C corresponds to 1000A, 1015C corresponds to 1015A, 1025C corresponds to 1020A, 1030C corresponds to 1025A, 1040C corresponds to 1030A, 1045C corresponds to 1035A, 1055C, 1060C, 1065C and 1070C correspond to 1040A, and 1075C corresponds to 1045A.

As will be appreciated in view of the above-described embodiments of the invention, the RAN 120 can be notified of a high-priority for a call, and can, if necessary, de-allocate resources from other, lower-priority calls to make available sufficient resources for the higher-priority call. The resources may then be allocated to the high-priority call participant that has requested the resources. The methodologies described herein apply both to an initiator of the high-priority call, as well as targets of the high-priority call. Further, as discussed above, the DSCP value in the IP header of signaling packets can convey information both to the RAN 120, and the application server 170. The DSCP value can be used to convey information in many different types of applications, including but not limited to QChat for group calls, and Gmail for email service.

Further, while above-described embodiments of the invention have been directed to multicast protocols and group calls, it will be appreciated that other embodiments of the invention can be directed towards unicast calls, or alternatively to any type of channel set-up that requires call support resources (e.g., a given level of QoS, a dedicated traffic channel on which to transmit or receive information, etc.). For example, a given AT can use the general protocols described herein for establishing transport channels, even where a call is not desired. In this example, the given AT can add the SYN message for TCP, or INIT message when using SCTP and transmit it as part of a DOS message with or without the other messages in the bundle as part of the access capsule.

Also, while above-described embodiments are generally given with respect to EV-DO implementations, other embodiments of the invention can be directed to other types of communication protocols. For example, in a 1x system, high-priority status can be indicated via an Origination message during call set-up (e.g., instead of a ConnectionRequest message as in EV-DO, for example). Accordingly, embodiments of the invention are not intended to be limited to any particular protocol unless a protocol is explicitly recited in the claims.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Accordingly, an embodiment of the invention can include a computer-readable medium including code stored thereon for bundling communication messages in a wireless network comprising: code for causing a computer to bundle a connection request and a reservation for QoS resources into an access message, and code for causing a computer to transmit the access message to an access network. Further, any of the functions describe herein can be included in as additional code in further embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of setting up a high-priority communication session within a wireless communications system operating in accordance with a wireless communications protocol, comprising:
    receiving a communication session set-up message with a flag indicating that a communication session has a high priority status;
    scheduling a page of an access terminal, the access terminal being one of an initiator of the communication session or a target of the communication session;
    paging the access terminal;
    receiving a request from the access terminal for communication session support resources associated with the communication session in response to the page;
    determining whether sufficient communication session support resources are available for allocating to the access terminal for supporting the communication session;
    selecting at least one communication session support resource from at least one other access terminal for de-allocation, the selected at least one communication session support resource associated with a communication session having a lower priority than the communication session;
    sending instructions to the at least one other access terminal to facilitate de-allocation of the selected at least one communication session support resource; and
    allocating one or more communication session support resources to the access terminal for supporting the communication session after the selected at least one communication session support resource is de-allocated from the at least one other access terminal.

2. The method of claim 1, wherein the access terminal is an initiator of the communication session.

3. The method of claim 2, wherein the request for resources includes a connection request message having a flag that indicates high priority status for the communication session.

4. The method of claim 3, wherein the wireless communications protocol is 1xEV-DO Rev. A, and the flag is within a RequestReason field of the connection request message.

5. The method of claim 3, wherein the wireless communications protocol is in accordance with 1xEV-DO Rev. B, and the flag is within an EmergencyIndicator field of the connection request message.

6. The method of claim 3, wherein the wireless communications protocol is 1xEV-DO Rev. A, and the flag is within a Reserved field of the connection request message.

7. The method of claim 2, wherein the request for resources includes a reservation on request message having a flag that indicates high priority status for the communication session.

8. The method of claim 6, wherein the wireless communications protocol is 1xEV-DO Rev. B, and the flag is an EmergencyIndicator field of the reservation on request message.

9. A method of setting up a high-priority communication session within a wireless communications system operating in accordance with a wireless communications protocol, comprising:
    receiving a request from an access terminal for communication session support resources associated with a communication session;

determining whether sufficient communication session support resources are available for allocating to the access terminal for supporting the communication session;

selecting at least one communication session support resource from at least one other access terminal for de-allocation, the selected at least one communication session support resource associated with a communication session having a lower priority than the communication session;

sending instructions to the at least one other access terminal to facilitate de-allocation of the selected at least one communication session support resource; and allocating one or more communication session support resources to the access terminal for supporting the communication session after the selected at least one communication session support resource is de-allocated from the at least one other access terminal, wherein:
the access terminal is an initiator of the communication session; and the request for resources is included within a bundled message that includes a route update (RUP) message, a connection request message, a reservation on request message and a communication session request message.

10. The method of claim 9, wherein the request for resources requests a traffic channel (TCH) and quality of service (QoS) resources.

11. The method of claim 2, wherein the request for resources includes a signaling message having a flag that indicates high priority status for the communication session.

12. A method of setting up a high-priority communication session within a wireless communications system operating in accordance with a wireless communications protocol, comprising:

receiving a request from an access terminal for communication session support resources associated with a communication session;

determining whether sufficient communication session support resources are available for allocating to the access terminal for supporting the communication session;

selecting at least one communication session support resource from at least one other access terminal for de-allocation, the selected at least one communication session support resource associated with a communication session having a lower priority than the communication session;

sending instructions to the at least one other access terminal to facilitate de-allocation of the selected at least one communication session support resource; and allocating one or more communication session support resources to the access terminal for supporting the communication session after the selected at least one communication session support resource is de-allocated from the at least one other access terminal, wherein:
the access terminal is an initiator of the communication session;

the request for resources includes a connection request message having a flag that indicates high priority status for the communication session; and the flag is a Diffserv Code Point (DSCP) value.

13. The method of claim 2, wherein the selected at least one communication session support resource corresponds to a traffic channel (TCH).

14. The method of claim 13, wherein the sending step sends instructions to tear down the TCH from the at least one other access terminal.

15. The method of claim 14, wherein the sent instructions correspond to a ConnectionClose message.

16. The method of claim 2, wherein the selected at least one communication session support resource corresponds to a traffic channel (TCH) and a quality of service (QoS) resource.

17. The method of claim 16, wherein the sending step sends instructions to tear down the TCH and the QoS resource from the at least one other access terminal.

18. A method of setting up a high-priority communication session within a wireless communications system operating in accordance with a wireless communications protocol, comprising:

receiving a request from an access terminal for communication session support resources associated with a communication session;

determining whether sufficient communication session support resources are available for allocating to the access terminal for supporting the communication session;

selecting at least one communication session support resource from at least one other access terminal for de-allocation, the selected at least one communication session support resource associated with a communication session having a lower priority than the communication session;

sending instructions to the at least one other access terminal to facilitate de-allocation of the selected at least one communication session support resource; and allocating one or more communication session support resources to the access terminal for supporting the communication session after the selected at least one communication session support resource is de-allocated from the at least one other access terminal, wherein:
the access terminal is an initiator of the communication session;

the selected at least one communication session support resource corresponds to a traffic channel (TCH) and a quality of service (QoS) resource;

the sending step sends instructions to tear down the TCH and the QoS resource from the at least one other access terminal; and the sent instructions correspond to a ConnectionClose message for tearing down the TCH and a Fwd/RevReservationOff message for de-allocating the QoS resource from the at least one other access terminal.

19. The method of claim 1, wherein more than two priority levels for communication sessions are provided for within a priority hierarchy by the wireless communications protocol, with the communication session having a higher priority than the communication session associated with the selected at least one communication session support resource within the priority hierarchy.

20. The method of claim 1, wherein the access terminal is a target access terminal for the communication session.

21. The method of claim 20, wherein scheduling the communication session set-up message for transmission on a downlink control channel places the page of the target access terminal ahead of at least one page for one or more communication sessions having a lower priority status than the communication session on a transmission queue of a downlink paging channel.

22. The method of claim 20, further comprising:
transmitting the communication session set-up message as an announce message announcing the communication session to the target access terminal after the allocating step.

23. The method of claim 20, further comprising:
receiving a communication session set-up message with a flag indicating that the communication session set-up message is to be transmitted to the target access terminal on a downlink control channel;
scheduling the communication session set-up message for transmission on the downlink control channel; and
transmitting the communication session set-up message to the target access terminal on the downlink control channel, wherein the receiving step receives the request for communication session support resources from the target access terminal in response to the communication session set-up message.

24. A method of setting up a high-priority communication session within a wireless communications system operating in accordance with a wireless communications protocol, comprising:
receiving a communication session set-up message with a flag indicating that the communication session set-up message is to be transmitted to a target access terminal on a downlink control channel;
scheduling the communication session set-up message for transmission on a downlink control channel;
transmitting the communication session set-up message to the target access terminal on the downlink control channel;
receiving a request from the target access terminal for communication session support resources associated with the communication session in response to transmitting the communication session set-up message;
determining whether sufficient communication session support resources are available for allocating to the target access terminal;
selecting at least one communication session support resource from at least one other access terminal for de-allocation, the selected at least one communication session support resource associated with a communication session having a lower priority than the communication session;
sending instructions to the at least one other access terminal to facilitate de-allocation of the selected at least one communication session support resource; and
allocating one or more communication session support resources to the access terminal for supporting the communication session after the selected at least one communication session support resource is de-allocated from the at least one other access terminal,
wherein scheduling the communication session set-up message for transmission on a downlink control channel positions the communication session set-up message of the target access terminal ahead of at least one message for one or more communication sessions having a lower priority status than the communication session on a transmission queue of the downlink control channel.

25. The method of claim 23, wherein the communication session set-up message is an announce message, and the transmitting step transmits the announce message within a data-over-signaling (DOS) message on a control channel capsule of the downlink control channel.

26. The method of claim 1, wherein the communication session corresponds to a call.

27. The method of claim 26, wherein the call is a unicast call or a multicast call.

28. The method of claim 1, wherein the communication session corresponds to data transfer to establish a transport channel.

29. The method of claim 1, wherein the communication session includes messaging corresponding to both a request for a call and a data transfer to establish a transport channel.

30. The method of claim 1, wherein the selected at least one communication session support resource corresponds to a complete de-allocation of communication session support resources of a type from the at least one other access terminal or a partial de-allocation of communication session support resources of the type from the at least one other access terminal.

31. The method of claim 30, wherein the selected at least one communication session support resource corresponds to a complete de-allocation of Quality of Service (QoS) resources from the at least one other access terminal, such that the at least one other access terminal has no QoS resources after the de-allocation.

32. A method of setting up a high-priority communication session within a wireless communications system operating in accordance with a wireless communications protocol, comprising:
receiving a request from an access terminal for communication session support resources associated with a communication session;
determining whether sufficient communication session support resources are available for allocating to the access terminal for supporting the communication session;
selecting at least one communication session support resource from at least one other access terminal for de-allocation, the selected at least one communication session support resource associated with a communication session having a lower priority than the communication session;
sending instructions to the at least one other access terminal to facilitate de-allocation of the selected at least one communication session support resource; and
allocating one or more communication session support resources to the access terminal for supporting the communication session after the selected at least one communication session support resource is de-allocated from the at least one other access terminal,
wherein the selected at least one communication session support resource corresponds to a partial de-allocation of Quality of Service (QoS) resources from the at least one other access terminal, such that the at least one other access terminal has fewer QoS resources after the de-allocation than before the de-allocation.

33. The method of claim 30, wherein the selected at least one communication session support resource corresponds to a complete de-allocation of a traffic channel (TCH) from the at least one other access terminal, such that the TCH is torn down after the de-allocation.

34. An access network server of a wireless communications system configured to operate in accordance with a wireless communications protocol, the access network server comprising:
means for receiving a communication session set-up message having a flag indicating that a communication session has a high priority status;
means for scheduling a page of a access terminal, the access terminal being one of an initiator or a target of the communication session;

means for paging the access terminal;
means for receiving a request from the access terminal for communication session support resources associated with the communication session in response to the page;
means for determining whether sufficient communication session support resources are available for allocating to the access terminal for supporting the communication session;
means for selecting at least one communication session support resource from at least one other access terminal for de-allocation, the selected at least one communication session support resource associated with a communication session having a lower priority than the communication session;
means for sending instructions to the at least one other access terminal to facilitate de-allocation of the selected at least one communication session support resource; and
means for allocating one or more communication session support resources to the access terminal for supporting the communication session after the selected at least one communication session support resource is de-allocated from the at least one other access terminal.

35. The access network server of claim 34, wherein the access terminal is an initiator of the communication session.

36. The access network server of claim 35, wherein the selected at least one communication session support resource corresponds to a traffic channel (TCH).

37. The access network server of claim 35, wherein the selected at least one communication session support resource corresponds to a traffic channel (TCH) and a quality of service (QoS) resource.

38. The access network server of claim 34, wherein the access terminal is a target access terminal for the communication session.

39. The access network server of claim 38, wherein the means for scheduling places the page of the target access terminal ahead of at least one page for one or more communication sessions having a lower priority status than the communication session on a transmission queue of a downlink paging channel.

40. The access network server of claim 38, further comprising:
means for transmitting the communication session set-up message as an announce message announcing the communication session to the target access terminal after the allocation.

41. The access network server of claim 38, further comprising:
means for receiving a communication session set-up message with a flag indicating that the communication session set-up message is to be transmitted to the target access terminal on a downlink control channel;
means for scheduling the communication session set-up message for transmission on the downlink control channel; and
means for transmitting the communication session set-up message to the target access terminal on the downlink control channel, wherein the means for receiving receives the request for communication session support resources from the target access terminal in response to the communication session set-up message.

42. An access network server within a wireless communications system operating in accordance with a wireless communications protocol, comprising:
a memory; and
a processor coupled to the memory, wherein the processor is configured with processor-executable instructions to perform operations comprising:
receiving a communication session set-up message with a flag indicating that a communication session has a high priority status;
scheduling a page of an access terminal, the access terminal being one of an initiator or a target of the communication session;
paging the access terminal;
receiving a request from an access terminal for communication session support resources associated with a communication session in response to the page;
determining whether sufficient communication session support resources are available for allocating to the access terminal for supporting the communication session;
selecting at least one communication session support resource from at least one other access terminal for de-allocation, the selected at least one communication session support resource associated with a communication session having a lower priority than the communication session;
sending instructions to the at least one other access terminal to facilitate de-allocation of the selected at least one communication session support resource; and
allocating one or more communication session support resources to the access terminal for supporting the communication session after the selected at least one communication session support resource is de-allocated from the at least one other access terminal.

43. The access network server of claim 42, wherein the access terminal is an initiator of the communication session.

44. The access network server of claim 43, wherein the selected at least one communication session support resource corresponds to a traffic channel (TCH).

45. The access network server of claim 43, wherein the selected at least one communication session support resource corresponds to a traffic channel (TCH) and a quality of service (QoS) resource.

46. The access network server of claim 42, wherein the access terminal is a target access terminal for the communication session.

47. The access network server of claim 46, wherein the processor is configured with processor-executable instructions to perform operations such that scheduling a page of an access terminal places the page of the target access terminal ahead of at least one page for one or more communication sessions having a lower priority status than the communication session on a transmission queue of a downlink paging channel.

48. The access network server of claim 46, wherein the processor is configured with processor-executable instructions to perform operations further comprising:
transmitting the communication session set-up message as an announce message announcing the communication session to the target access terminal after the allocation.

49. The access network server of claim 42, wherein the processor is configured with processor-executable instructions to perform operations further comprising:
receiving a communication session set-up message with a flag indicating that the communication session set-up message is to be transmitted to the target access terminal on a downlink control channel;
scheduling the communication session set-up message for transmission on the downlink control channel; and transmitting the communication session set-up message to the target access terminal on the downlink control channel, wherein the logic configured to receive receives the request for communication session support resources from the target access terminal in response to the communication session set-up message.

50. A non-transitory computer-readable medium having stored thereon processor-executable software instructions configured to cause an access network server processor within a wireless communications system operating in accordance with a wireless communications protocol to perform operations comprising:
receiving a communication session set-up message with a flag indicating that a communication session has a high priority status;
scheduling a page of an access terminal, the access terminal being one of an initiator of the communication session or a target of the communication session;
paging the access terminal;
receiving a request from the access terminal for communication session support resources associated with the communication session in response to the page;
determining whether sufficient communication session support resources are available for allocating to the access terminal for supporting the communication session;
selecting at least one communication session support resource from at least one other access terminal for de-allocation, the selected at least one communication session support resource associated with a communication session having a lower priority than the communication session;
sending instructions to the at least one other access terminal to facilitate de-allocation of the selected at least one communication session support resource; and
allocating one or more communication session support resources to the access terminal for supporting the communication session after the selected at least one communication session support resource is de-allocated from the at least one other access terminal.

51. The non-transitory computer-readable medium of claim 50, wherein the stored processor-executable instructions are configured to cause the access network server processor to perform operations such that the access terminal is an initiator of the communication session.

52. The non-transitory computer-readable medium of claim 51, wherein the stored processor-executable instructions are configured to cause the access network server processor to perform operations such that the selected at least one communication session support resource corresponds to a traffic channel (TCH).

53. The non-transitory computer-readable medium of claim 51, wherein the stored processor-executable instructions are configured to cause the access network server processor to perform operations such that the selected at least one communication session support resource corresponds to a traffic channel (TCH) and a quality of service (QoS) resource.

54. The non-transitory computer-readable medium of claim 50, wherein the stored processor-executable instructions are configured to cause the access network server processor to perform operations such that the access terminal is a target access terminal for the communication session.

55. The non-transitory computer-readable medium of claim 54, wherein the stored processor-executable instructions are configured to cause the access network server processor to perform operations such that scheduling a page of the target access terminal comprises placing the page of the target access terminal ahead of at least one page for one or more communication sessions having a lower priority status than the communication session on a transmission queue of a downlink paging channel.

56. The non-transitory computer-readable medium of claim 54, wherein the stored processor-executable instructions are configured to cause the access network server processor to perform operations further comprising:
transmitting the communication session set-up message as an announce message announcing the communication session to the target access terminal after the allocation.

57. The non-transitory computer-readable medium of claim 50, wherein the stored processor-executable instructions are configured to cause the access network server processor to perform operations further comprising:
receiving a communication session set-up message with a flag indicating that the communication session set-up message is to be transmitted to the target access terminal on a downlink control channel;
scheduling the communication session set-up message for transmission on the downlink control channel; and
transmitting the communication session set-up message to the target access terminal on the downlink control channel, wherein the program code to receive receives the request for communication session support resources from the target access terminal in response to the communication session set-up message.

58. An access network server of a wireless communications system configured to operate in accordance with a wireless communications protocol, the access network server comprising:
means for receiving a request from an access terminal for communication session support resources associated with a communication session;
means for determining whether sufficient communication session support resources are available for allocating to the access terminal for supporting the communication session;
means for selecting at least one communication session support resource from at least one other access terminal for de-allocation, the selected at least one communication session support resource associated with a communication session having a lower priority than the communication session;
means for sending instructions to the at least one other access terminal to facilitate de-allocation of the selected at least one communication session support resource; and
means for allocating one or more communication session support resources to the access terminal for supporting the communication session after the selected at least one communication session support resource is de-allocated from the at least one other access terminal,
wherein:
the access terminal is an initiator of the communication session; and
the request for resources is included within a bundled message that includes a route update (RUP) message, a connection request message, a reservation on request message and a communication session request message.

59. The access network server of claim 58, wherein means for receiving a request from an access terminal for communication session support resources associated with a communication session comprises means for receiving a request for traffic channel (TCH) and quality of service (QoS) resources.

60. An access network server within a wireless communications system operating in accordance with a wireless communications protocol, comprising:
a memory; and
a processor coupled to the memory, wherein the processor is configured with processor-executable instructions to perform operations comprising:
receiving a request from an access terminal for communication session support resources associated with a communication session;
determining whether sufficient communication session support resources are available for allocating to the access terminal for supporting the communication session;
selecting at least one communication session support resource from at least one other access terminal for de-allocation, the selected at least one communication session support resource associated with a communication session having a lower priority than the communication session;
sending instructions to the at least one other access terminal to facilitate de-allocation of the selected at least one communication session support resource; and
allocating one or more communication session support resources to the access terminal for supporting the communication session after the selected at least one communication session support resource is de-allocated from the at least one other access terminal,
wherein:
the access terminal is an initiator of the communication session; and
the request for resources is included within a bundled message that includes a route update (RUP) message, a connection request message, a reservation on request message and a communication session request message.

61. The access network server of claim 60, wherein the processor is configured with processor-executable instructions to perform operations such that receiving a request from an access terminal for communication session support resources associated with a communication session comprises receiving a request for traffic channel (TCH) and quality of service (QoS) resources.

62. A non-transitory computer-readable medium having stored thereon processor-executable software instructions configured to cause an access network server processor within a wireless communications system operating in accordance with a wireless communications protocol to perform operations comprising:
receiving a request from an access terminal for communication session support resources associated with a communication session;
determining whether sufficient communication session support resources are available for allocating to the access terminal for supporting the communication session;
selecting at least one communication session support resource from at least one other access terminal for de-allocation, the selected at least one communication session support resource associated with a communication session having a lower priority than the communication session;
sending instructions to the at least one other access terminal to facilitate de-allocation of the selected at least one communication session support resource; and
allocating one or more communication session support resources to the access terminal for supporting the communication session after the selected at least one communication session support resource is de-allocated from the at least one other access terminal,
wherein:
the access terminal is an initiator of the communication session; and
the request for resources is included within a bundled message that includes a route update (RUP) message, a connection request message, a reservation on request message and a communication session request message.

63. The non-transitory computer-readable medium of claim 62, wherein the stored processor-executable instructions are configured to cause the access network server processor to perform operations such that receiving a request from an access terminal for communication session support resources associated with a communication session comprises receiving a request for traffic channel (TCH) and quality of service (QoS) resources.

64. An access network server of a wireless communications system configured to operate in accordance with a wireless communications protocol, the access network server comprising:
means for receiving a request from an access terminal for communication session support resources associated with a communication session;
means for determining whether sufficient communication session support resources are available for allocating to the access terminal for supporting the communication session;
means for selecting at least one communication session support resource from at least one other access terminal for de-allocation, the selected at least one communication session support resource associated with a communication session having a lower priority than the communication session;
means for sending instructions to the at least one other access terminal to facilitate de-allocation of the selected at least one communication session support resource; and
means for allocating one or more communication session support resources to the access terminal for supporting the communication session after the selected at least one communication session support resource is de-allocated from the at least one other access terminal,
wherein:
the access terminal is an initiator of the communication session;
the request for resources includes a connection request message having a flag that indicates high priority status for the communication session; and
the flag is a Diffserv Code Point (DSCP) value.

65. An access network server within a wireless communications system operating in accordance with a wireless communications protocol, comprising:
a memory; and
a processor coupled to the memory, wherein the processor is configured with processor-executable instructions to perform operations comprising:
receiving a request from an access terminal for communication session support resources associated with a communication session;
determining whether sufficient communication session support resources are available for allocating to the access terminal for supporting the communication session;

selecting at least one communication session support resource from at least one other access terminal for de-allocation, the selected at least one communication session support resource associated with a communication session having a lower priority than the communication session;

sending instructions to the at least one other access terminal to facilitate de-allocation of the selected at least one communication session support resource; and allocating one or more communication session support resources to the access terminal for supporting the communication session after the selected at least one communication session support resource is de-allocated from the at least one other access terminal, wherein:
the access terminal is an initiator of the communication session;
the request for resources includes a connection request message having a flag that indicates high priority status for the communication session; and
the flag is a Diffserv Code Point (DSCP) value.

66. A non-transitory computer-readable medium having stored thereon processor-executable software instructions configured to cause an access network server processor within a wireless communications system operating in accordance with a wireless communications protocol to perform operations comprising:

receiving a request from an access terminal for communication session support resources associated with a communication session;

determining whether sufficient communication session support resources are available for allocating to the access terminal for supporting the communication session;

selecting at least one communication session support resource from at least one other access terminal for de-allocation, the selected at least one communication session support resource associated with a communication session having a lower priority than the communication session;

sending instructions to the at least one other access terminal to facilitate de-allocation of the selected at least one communication session support resource; and allocating one or more communication session support resources to the access terminal for supporting the communication session after the selected at least one communication session support resource is de-allocated from the at least one other access terminal, wherein:
the access terminal is an initiator of the communication session;
the request for resources includes a connection request message having a flag that indicates high priority status for the communication session; and
the flag is a Diffserv Code Point (DSCP) value.

67. An access network server of a wireless communications system configured to operate in accordance with a wireless communications protocol, the access network server comprising:

means for receiving a request from an access terminal for communication session support resources associated with a communication session;

means for determining whether sufficient communication session support resources are available for allocating to the access terminal for supporting the communication session;

means for selecting at least one communication session support resource from at least one other access terminal for de-allocation, the selected at least one communication session support resource associated with a communication session having a lower priority than the communication session;

means for sending instructions to the at least one other access terminal to facilitate de-allocation of the selected at least one communication session support resource; and means for allocating one or more communication session support resources to the access terminal for supporting the communication session after the selected at least one communication session support resource is de-allocated from the at least one other access terminal, wherein:
the access terminal is an initiator of the communication session;
the selected at least one communication session support resource corresponds to a traffic channel (TCH) and a quality of service (QoS) resource; and
the means for sending includes means for sending instructions to tear down the TCH and the QoS resource from the at least one other access terminal such that the sent instructions correspond to a ConnectionClose message for tearing down the TCH and a Fwd/RevReservationOff message for de-allocating the QoS resource from the at least one other access terminal.

68. An access network server within a wireless communications system operating in accordance with a wireless communications protocol, comprising:

a memory; and a processor coupled to the memory, wherein the processor is configured with processor-executable instructions to perform operations comprising:

receiving a request from an access terminal for communication session support resources associated with a communication session;

determining whether sufficient communication session support resources are available for allocating to the access terminal for supporting the communication session;

selecting at least one communication session support resource from at least one other access terminal for de-allocation, the selected at least one communication session support resource associated with a communication session having a lower priority than the communication session;

sending instructions to the at least one other access terminal to facilitate de-allocation of the selected at least one communication session support resource; and allocating one or more communication session support resources to the access terminal for supporting the communication session after the selected at least one communication session support resource is de-allocated from the at least one other access terminal, wherein:
the access terminal is an initiator of the communication session;
the selected at least one communication session support resource corresponds to a traffic channel (TCH) and a quality of service (QoS) resource;
the sending step sends instructions to tear down the TCH and the QoS resource from the at least one other access terminal; and the sent instructions correspond to a ConnectionClose message for tearing down the TCH and a Fwd/RevReservationOff message for de-allocating the QoS resource from the at least one other access terminal.

69. A non-transitory computer-readable medium having stored thereon processor-executable software instructions configured to cause an access network server processor within a wireless communications system operating in accordance with a wireless communications protocol to perform operations comprising:
- receiving a request from an access terminal for communication session support resources associated with a communication session;
- determining whether sufficient communication session support resources are available for allocating to the access terminal for supporting the communication session;
- selecting at least one communication session support resource from at least one other access terminal for de-allocation, the selected at least one communication session support resource associated with a communication session having a lower priority than the communication session;
- sending instructions to the at least one other access terminal to facilitate de-allocation of the selected at least one communication session support resource; and
- allocating one or more communication session support resources to the access terminal for supporting the communication session after the selected at least one communication session support resource is de-allocated from the at least one other access terminal, wherein:
- the access terminal is an initiator of the communication session;
- the selected at least one communication session support resource corresponds to a traffic channel (TCH) and a quality of service (QoS) resource;
- the sending step sends instructions to tear down the TCH and the QoS resource from the at least one other access terminal; and
- the sent instructions correspond to a ConnectionClose message for tearing down the TCH and a Fwd/RevReservationOff message for de-allocating the QoS resource from the at least one other access terminal.

70. An access network server of a wireless communications system configured to operate in accordance with a wireless communications protocol, the access network server comprising:
- means for receiving a communication session set-up message with a flag indicating that the communication session set-up message is to be transmitted to a target access terminal on a downlink control channel;
- means for scheduling the communication session set-up message for transmission on a downlink control channel;
- means for transmitting the communication session set-up message to the target access terminal on the downlink control channel;
- means for receiving a request from the target access terminal for communication session support resources associated with the communication session in response to transmitting the communication session set-up message;
- means for determining whether sufficient communication session support resources are available for allocating to the target access terminal;
- means for selecting at least one communication session support resource from at least one other access terminal for de-allocation, the selected at least one communication session support resource associated with a communication session having a lower priority than the communication session;
- means for sending instructions to the at least one other access terminal to facilitate de-allocation of the selected at least one communication session support resource; and
- means for allocating one or more communication session support resources to the access terminal for supporting the communication session after the selected at least one communication session support resource is de-allocated from the at least one other access terminal,
wherein means for scheduling includes means for positioning the communication session set-up message of the target access terminal ahead of at least one message for one or more communication sessions having a lower priority status than the communication session on a transmission queue of the downlink control channel.

71. An access network server within a wireless communications system operating in accordance with a wireless communications protocol, comprising:
- a memory; and
- a processor coupled to the memory, wherein the processor is configured with processor-executable instructions to perform operations comprising:
  - receiving a communication session set-up message with a flag indicating that the communication session set-up message is to be transmitted to a target access terminal on a downlink control channel;
  - scheduling the communication session set-up message for transmission on a downlink control channel;
  - transmitting the communication session set-up message to the target access terminal on the downlink control channel;
  - receiving a request from the target access terminal for communication session support resources associated with the communication session in response to transmitting the communication session set-up message;
  - determining whether sufficient communication session support resources are available for allocating to the target access terminal;
  - selecting at least one communication session support resource from at least one other access terminal for de-allocation, the selected at least one communication session support resource associated with a communication session having a lower priority than the communication session;
  - sending instructions to the at least one other access terminal to facilitate de-allocation of the selected at least one communication session support resource; and
  - allocating one or more communication session support resources to the access terminal for supporting the communication session after the selected at least one communication session support resource is de-allocated from the at least one other access terminal,
  wherein scheduling the communication session set-up message for transmission on a downlink control channel positions the communication session set-up message of the target access terminal ahead of at least one message for one or more communication sessions having a lower priority status than the communication session on a transmission queue of the downlink control channel.

72. A non-transitory computer-readable medium having stored thereon processor-executable software instructions configured to cause an access network server processor within a wireless communications system operating in accordance with a wireless communications protocol to perform operations comprising:
- receiving a communication session set-up message with a flag indicating that the communication session set-up message is to be transmitted to a target access terminal on a downlink control channel;
- scheduling the communication session set-up message for transmission on a downlink control channel; and
- transmitting the communication session set-up message to the target access terminal on the downlink control channel;
- receiving a request from the target access terminal for communication session support resources associated with the communication session in response to transmitting the communication session set-up message;
- determining whether sufficient communication session support resources are available for allocating to the target access terminal;
- selecting at least one communication session support resource from at least one other access terminal for de-allocation, the selected at least one communication session support resource associated with a communication session having a lower priority than the communication session;
- sending instructions to the at least one other access terminal to facilitate de-allocation of the selected at least one communication session support resource; and
- allocating one or more communication session support resources to the access terminal for supporting the communication session after the selected at least one communication session support resource is de-allocated from the at least one other access terminal,
- wherein scheduling the communication session set-up message for transmission on a downlink control channel positions the communication session set-up message of the target access terminal ahead of at least one message for one or more communication sessions having a lower priority status than the communication session on a transmission queue of the downlink control channel.

73. An access network server of a wireless communications system configured to operate in accordance with a wireless communications protocol, the access network server comprising:
- means for receiving a request from an access terminal for communication session support resources associated with a communication session;
- means for determining whether sufficient communication session support resources are available for allocating to the access terminal for supporting the communication session;
- means for selecting at least one communication session support resource from at least one other access terminal for de-allocation, the selected at least one communication session support resource associated with a communication session having a lower priority than the communication session;
- means for sending instructions to the at least one other access terminal to facilitate de-allocation of the selected at least one communication session support resource; and
- means for allocating one or more communication session support resources to the access terminal for supporting the communication session after the selected at least one communication session support resource is de-allocated from the at least one other access terminal, wherein means for selecting includes means for selecting the at least one communication session support resource such that the selected session support resource corresponds to a partial de-allocation of Quality of Service (QoS) resources from the at least one other access terminal and such that the at least one other access terminal has fewer QoS resources after the de-allocation than before the de-allocation.

74. An access network server within a wireless communications system operating in accordance with a wireless communications protocol, comprising:
- a memory; and
- a processor coupled to the memory, wherein the processor is configured with processor-executable instructions to perform operations comprising:
  - receiving a request from an access terminal for communication session support resources associated with a communication session;
  - determining whether sufficient communication session support resources are available for allocating to the access terminal for supporting the communication session;
  - selecting at least one communication session support resource from at least one other access terminal for de-allocation, the selected at least one communication session support resource associated with a communication session having a lower priority than the communication session;
  - sending instructions to the at least one other access terminal to facilitate de-allocation of the selected at least one communication session support resource; and
  - allocating one or more communication session support resources to the access terminal for supporting the communication session after the selected at least one communication session support resource is de-allocated from the at least one other access terminal,
  - wherein the selected at least one communication session support resource corresponds to a partial de-allocation of Quality of Service (QoS) resources from the at least one other access terminal, such that the at least one other access terminal has fewer QoS resources after the de-allocation than before the de-allocation.

75. A non-transitory computer-readable medium having stored thereon processor-executable software instructions configured to cause an access network server processor within a wireless communications system operating in accordance with a wireless communications protocol to perform operations comprising:
- receiving a request from an access terminal for communication session support resources associated with a communication session;
- determining whether sufficient communication session support resources are available for allocating to the access terminal for supporting the communication session;
- selecting at least one communication session support resource from at least one other access terminal for de-allocation, the selected at least one communication session support resource associated with a communication session having a lower priority than the communication session;

sending instructions to the at least one other access terminal to facilitate de-allocation of the selected at least one communication session support resource; and allocating one or more communication session support resources to the access terminal for supporting the communication session after the selected at least one communication session support resource is de-allocated from the at least one other access terminal, wherein the selected at least one communication session support resource corresponds to a partial de-allocation of Quality of Service (QoS) resources from the at least one other access terminal, such that the at least one other access terminal has fewer QoS resources after the de-allocation than before the de-allocation.

* * * * *